US008937620B1

(12) United States Patent
Teller

(10) Patent No.: US 8,937,620 B1
(45) Date of Patent: Jan. 20, 2015

(54) SYSTEM AND METHODS FOR GENERATION AND CONTROL OF STORY ANIMATION

(75) Inventor: Eric Teller, San Francisco, CA (US)

(73) Assignee: Google Inc., Mountain View, CA (US)

( * ) Notice: Subject to any disclaimer, the term of this patent is extended or adjusted under 35 U.S.C. 154(b) by 739 days.

(21) Appl. No.: 13/082,089

(22) Filed: Apr. 7, 2011

(51) Int. Cl.
*G06T 13/00* (2011.01)
*G06T 11/00* (2006.01)

(52) U.S. Cl.
USPC .......................... 345/473; 345/467; 345/474

(58) Field of Classification Search
CPC ....................................................... G06T 13/20
See application file for complete search history.

(56) References Cited

U.S. PATENT DOCUMENTS

| | | | |
|---|---|---|---|
| 5,880,731 A | 3/1999 | Liles et al. | |
| 6,329,986 B1 | 12/2001 | Cheng | |
| 6,404,438 B1 * | 6/2002 | Hatlelid et al. | 345/473 |
| 6,466,213 B2 | 10/2002 | Bickmore et al. | |
| 6,580,811 B2 | 6/2003 | Maurer et al. | |
| 6,919,892 B1 | 7/2005 | Cheiky et al. | |
| 6,940,454 B2 | 9/2005 | Paetzold et al. | |
| 6,948,131 B1 | 9/2005 | Neven et al. | |
| 7,006,098 B2 | 2/2006 | Bickmore et al. | |
| 7,027,054 B1 | 4/2006 | Cheiky et al. | |
| 7,050,655 B2 | 5/2006 | Ho et al. | |
| 7,184,047 B1 | 2/2007 | Crampton | |
| 7,240,050 B2 | 7/2007 | Zhou et al. | |
| 7,386,799 B1 | 6/2008 | Clanton et al. | |
| 7,412,077 B2 | 8/2008 | Li et al. | |
| 7,468,728 B2 | 12/2008 | Watt | |
| 7,843,471 B2 | 11/2010 | Doan et al. | |
| 7,844,463 B2 | 11/2010 | Basso et al. | |
| 7,844,467 B1 | 11/2010 | Cosatto et al. | |
| 7,849,145 B2 | 12/2010 | Kang et al. | |
| 7,850,526 B2 | 12/2010 | Zalewski et al. | |
| 7,852,994 B1 | 12/2010 | Blair et al. | |

(Continued)

FOREIGN PATENT DOCUMENTS

| | | | | |
|---|---|---|---|---|
| WO | WO 2009055929 A1 * | 5/2009 | ........... | G11B 27/034 |
| WO | WO 2010045735 A1 * | 4/2010 | .............. | G06T 15/70 |

(Continued)

OTHER PUBLICATIONS

"Xtranormal tutorial"; https://www.youtube.com/watch?v=DtWI-em062I; Published on Jan. 24, 2010.*

(Continued)

*Primary Examiner* — Kee M Tung
*Assistant Examiner* — Zhengxi Liu
(74) *Attorney, Agent, or Firm* — McDonnell Boehnen Hulbert & Berghoff LLP

(57) ABSTRACT

A system and methods are disclosed which provide simple and rapid animated content creation with simple control of scene characteristics, scene-to-scene transitions, content elements, and certain element behaviors. Tools are disclosed for conveniently applying scene characteristic and transition labels to control the look and feel of a scene, such as camera attributes, lighting, and the like. A voice input tool enables quick creation of spoken language segments for animated characters. Tools are provided to enable multiple content creators to collaborate on content creation. A warehouse model is disclosed for animation content elements. The ability to create dynamic animated content, and the ability to increase the emotional and dramatic texture of that content, are provided through use of relatively simple and intuitive tools.

18 Claims, 16 Drawing Sheets

(56) References Cited

U.S. PATENT DOCUMENTS

| | | |
|---|---|---|
| 7,859,551 B2 | 12/2010 | Bulman et al. |
| 7,867,086 B2 | 1/2011 | Sitrick |
| 7,870,074 B2 | 1/2011 | Amsterdam et al. |
| 2012/0047447 A1* | 2/2012 | Haq .............................. 715/752 |

FOREIGN PATENT DOCUMENTS

| | | | | |
|---|---|---|---|---|
| WO | WO 2010045736 A1 * | 4/2010 | ............. | G06T 13/00 |
| WO | WO 2010118528 A1 * | 10/2010 | ............. | H04N 5/265 |

OTHER PUBLICATIONS

"Film Editing Glossary" http://www.learner.org/interactives/cinema/editing2.html. Archived on Aug. 25, 2008. Retrieved on Apr. 25, 2014 from <https://web.archive.org/web/20080825020601/http://www.learner.org/interactives/cinema/editing2.html>.*

Chopra, Aidan. Google SketchUp 7 for dummies. John Wiley & Sons, 2009.*

* cited by examiner

| | FILE | EDIT | LAYOUT | TEMPLATES |

SCENE MOOD LABEL DEFINITION

Label Text: [ ] — 46

Label Style: [oval button, blue ▼] — 48a

Number of Cameras: [2 ⇵] — 48b

Camera-to-Camera Shift Speed: [SLOW ▼] — 48c

Camera Stability: [Very Stable ▼] — 48d

Pan-to-Zoom: [Slow, on Speaker ▼] — 48e

Camera Focus: [Slight Blur ▼] — 48f

Scene Lighting: [Moderately Warm ▼] — 48g

Lighting Position: [Overhead ▼] — 48h

Number of Light Sources: [2 ⇵] — 48i

SYSTEM AND METHODS FOR GENERATION AND CONTROL OF STORY ANIMATION

BACKGROUND

The present disclosure is related to video animation systems, and more specifically to methods and apparatus for improved content creation within such systems.

The internet has greatly simplified the sharing of descriptions, narratives, reports, impressions, and the like, whether written, audible, visual or a combination thereof, intended to tell some form of a story. Content created by one individual can easily be viewed by others (e.g., a video posted on YouTube.com or a photo album on Shutterfly.com), pushed out to others (e.g., by email or blog publishing), and so on. The content may be factual (such as a report of a newsworthy event), may be personal (such as a shared on-line vacation photo album), may be commercial (such as a description of a business's professional services at its website), may be artistic (such as music videos), and so on.

In contrast with the relative ease of viewing and sharing content, creation of at least certain types of content remains challenging and time-consuming, especially for the technical novice. This is particularly true for scripted video content creation. As used herein, the term "video content" is content comprising an assembly of a number of visual images forming a scene (such as camera-based digital movies) as well as a dynamically generated presentation of serial images such as real-time computer animation, each usually also including audio elements. The term "scripted" as used herein refers not only to pre-determined spoken word (such as dialog) but also to defined scene characteristics such as lighting, costume, prop description and placement, scene-to-scene transition, sound effects, etc.

For purposes of the following discussion, scenes of video content are formed by assembling a series of frames in a time-wise linear fashion. A movie or clip is a series of scenes assembled together in a time-wise fashion. A character is a representation of an animate participant in a scene. An object is a representation of something other than a character in the scene. A background is the context into which a character or an object may be placed. Characters, objects, and backgrounds are collectively referred to as elements, although elements may include additional items such as sounds, text, scene controls, etc.

Professional-grade tools exist which allow an experienced user to create, edit, and distribute complex, scripted video content. However, these tools are typically very expensive, require sophisticated and expensive hardware, and are complicated to use effectively. Less complex and less costly tools exit for the consumer market, which attempt to simplify video content creation and editing. While relatively simple to use, these more basic tools are typically used to create assemblies of spontaneous video clips with added transitions, background music, narration, titles and so forth, rather than scripted stories. Creating quality scripted video content remains a challenging endeavor for those with limited expertise, time, and resources.

As an alternative to camera-based scripted video content, animation tools are available which can simplify the process of creating scripted animated content. Tools exists which allow a user to select from among an assortment of animated characters, insert those characters into a selected scene, select gestures the character may make, provide text for the character to speak, etc. Various user interfaces for creating content in this way are available. For example, characters may be placed in a scene by dragging then from a palette and dropping them at a desired location in the scene. Dragging and dropping may similarly set camera positions and camera movement. Dialog may be typed into a user interface window, causing the characters to recite the typed text. Scenes may be composed in this way within which scripted events may take place, with the user interface providing control of both dialog and certain scene characteristics. The relative ease and speed with which a user can create scripted animated content in this way suggests that it is certainly an alternative to, and could, in many cases, be a more desirable form of content creation when compared to camera-based scripted video content.

While certain professional-grade and even consumer-grade animation systems can provide significant animation control, the aforementioned drag-and-drop systems for animated content creation are of limited flexibility and produce content that is typically quite primitive. Many useful and important tools, capabilities, and options have either not been considered or are otherwise not provided in such systems. Lack of a robust suite of character features, backgrounds, scene features and transitions, fine control, etc. most often result in longer content appearing repetitive or static, thus losing a viewer's attention, limiting the ability to develop emotion or drama in a scene, etc. Consequently, it is almost impossible to impart important emotional and dramatic continuity and flow, common for example in feature films, to animated content with existing drag-and-drop content creation systems.

When animating a character to speak, text is typed into a window, and a text-to-speech synthesizer "reads" the text in conjunction with the animated character appearing to speak. However, virtually no control is provided over the subtle, and not so subtle, attributes of speech that separate computer synthesis speech from natural, human speech.

Furthermore, known drag-and-drop animated content creation tools are closed. That is, it is not typically possible to import characters, objects, backgrounds, attributes of characters or objects, scene controls (such as lighting and sound effects), etc. from other systems or users.

Still further, drag-and-drop animated content creation tools are typically designed for a single creator (or editor). Only when the content is completed is it made available for general viewing. This precludes the ability to allow an undefined and changing population of contributors to co-create and/or edit content as it is being created.

In addition, existing drag-and-drop content creation systems do not permit reuse of scenes or elements created for those scenes. Once a scene is rendered into a movie it is essentially locked, and may be viewed only. And while it is possible to associate a title with the rendered scene, there are no other tags, notes, or settable attributes for the scene which might simplify indexing, searching for, retrieving, reusing, etc. of the scene, elements in the scene, settings selected for the scene, etc.

SUMMARY

Accordingly, the present disclosure is directed to systems and methods for animated content creation that addresses shortcomings of known systems and methods including but not limited to those identified above. The systems and methods provide a wide range of creative control, the ability to create more dynamic animated content, and the ability to increase the emotional and dramatic texture of that content through use of relatively simple and intuitive tools.

According to one aspect of the present disclosure, a system is provided in which a user may define attributes of a scene into which one or more characters, objects, backgrounds, and like, may be placed. The user is provide with a set of simple indirect scene characteristic control labels, such as "mood" labels (e.g., "romantic", "tense", "scary"), "localization" labels (e.g., language, accent, units of measure, customs, cultural norms), animation "style" (e.g., realistic, manga, Disney, South Park, etc.), and so on which define for that scene one or more indirect attributes (that is, attributes either not directly controlled, or not controlled collectively with a common intent) such as lighting, camera angles, focus, scene layout, audio characteristics, motion and response characteristics of a character or object in the scene, skinning of a character or object in the scene, etc. in a predefined manner in accordance with the meaning of the associated label (e.g., to convey the mood, regionalization, animation style, etc. associated with the label). Labels may also control direct attributes, but at least one indirect control is always part of a label control. Many examples of a scene's "look and feel" are in the repertoire of the feature filmmaker today that can be translated into the animated content creation process. However, tools are needed to simplify that process. These tools can provide predefined labels, as well as labels that the user may define and associated scene settings, and that may be added to the library of such indirect control labels.

In addition to labels for scenes, another set of indirect scene transition labels may be provided for transitions from scene to scene. For example, if characters travel from one room to another between scenes, a "smooth" transition may be selected, which provides for reverse camera angles, consistency of lighting, consistency of character and object placement in the view, appropriate audio processing, and so forth. As another example, if there is a jump in time between scenes, a "jump" transition can be selected which can provide a pause at the end of one scene, a very short transitional break, then begin the next scene. Such transitions are important to provide continuity from scene to scene, and support the emotional and dramatic components of a scene, which are commonly lacking in drag-and-drop animated content. The user is also provided with tools to define new transitions and associated settings that may be added to the library of such indirect control labels.

According to another aspect of the present disclosure, spoken language segments (e.g., words) to be recited by animated characters can be input to the system by recording the user speaking such language segments. The language segments are converted to text representation within the system. Prosodic attributes of the spoken language segment—intonations, rhythm, and other aspects of the speech—can be extracted and noted within the system. The text representation may then be used to generate synthesized speech in a voice provided by the system, including the prosodic attributes extracted from the original spoken language segments. In this way, language segments are quickly and easily input for synthesizing, and the synthesized computer voice can easily be provided with the prosodic attributes of the actual spoken language segment, imparting enhanced realism to the synthesized voice.

According to still another aspect of the present disclosure, multiple users may simultaneously and relatively independently participate in the content creation process. The multiple users may, for example, each access a server-based application, and add characters, objects in the scene setting, background details, character voice or language segments (as mentioned above), and so on. They may also comment in an associated dialog box about the content as it is being created to further provide collaborative content creation. As changes are made to a scene, the response of the collaborators can be tracked. If the response is positive, the change could remain part of the scene, whereas if the response is negative, the change might be rejected. This modification-feedback loop may repeat over time such that a scene is continuously being updated in response to collective feedback. Collaborators may be included in the content creation process by specific invitation, or may respond to an open invitation to contribute (crowd sourcing).

According to yet another aspect of the disclosure, animation characters and objects may be imported from a variety of sources and added to scenes. These may be relatively static, such as picture to be hung on a wall in a scene. Or, they may be dynamic, such as an animated character. Imported objects bring with them their behavior attributes. They may have defined characteristics which control how they interact with other characters or objects in a scene, such as a chair defined to respond differently to different characters in a scene (e.g., when sitting in the chair, a "heavier" character sinks further down than a "lighter" character). A warehouse of such characters and objects may be provided which are tailored for quick and simple integration into a scene. Similarly, a warehouse of backgrounds may be provided. The characters, objects, and backgrounds in the warehouse may be tagged (e.g., "wombat", "1970s "couch", "French restaurant scene", etc.) to provide a simple organization and retrieval method.

According to a still further aspect of the present disclosure, whole scenes, or parts of scenes may be tagged prior to, during or after their creation. Tags may be merely descriptions associated with some or all of a scene, or may be control labels with description(s) but not-yet-implemented functionality (essential name placeholders) with certain scene controls associated therewith, making execution of directorial intent relatively simple and quick (e.g., providing cues to a creator that in a scene tagged as "funny", a character's movements may be animated to be jerky, exaggerated or slapstick, whereas in a scene tagged as serious animated character movements are slow and deliberate). In certain cases, the content creator may overwrite some or all of the attributes defined by scene tagging. Tagging may also be used by a system examining a plurality of similarly tagged scenes to extract common characteristics and determining characteristics common to those similarly tagged scenes, such as focus, camera position, lighting, and so on.

While the above summarizes a number of the unique aspects, features, and advantages of the present disclosure, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings:

FIG. 3 is an illustration of a portion of an animation editor interface in which a scene characteristic label may be defined or edited according to an embodiment of the present disclosure.

DETAILED DESCRIPTION

It will initially be understood that descriptions of well known routines, methods, processing techniques, components, equipment and other well known details are merely summarized or are omitted so as not to obscure the details of the present disclosure. Thus, where details are otherwise well known, we leave it to the application of the present disclosure to suggest or dictate choices relating to those details.

The systems and methods disclosed herein typically find applicability in networked computer devices and may be embodied as an application resident on such a networked computer device, as a server-resident application operated through a web browser interface, as a rich internet application, as a Flash (Adobe, Inc.) or Java (Oracle Corp.) applet, etc. For the purposes of the following description, it will be assumed that the system and methods disclosed herein are resident on, and operate with, a client computer communicatively connected to a server computer, although other arrangements are within the scope of the present disclosure and contemplated hereby.

A. Scene Characteristic Labels

As stated above, existing animation platforms either provide too few or too many and too complex a set of controls for controlling the "mood" created by the various attributes defining a scene. Furthermore, such platforms do not provide a quick and convenient method for setting a plurality of controls to accomplish a common intent, such as quick and simple way to re-regionalizing a scene (e.g., take a scene from an American setting to a French setting). In order to address this, a set of "labels" are provided which permit a content creator to simply and efficiently select attributes such as lighting, camera angle, character animations, object attributes, etc. for a scene to impart a desired characteristic to the scene. For the purposes of this part of the description, and without limiting the present description, we assume that the characteristic to be imparted is a mood. As used herein, mood is intended to mean the feelings and state of mind about a scene experienced by an average user when viewing a scene. Mood further includes the desired feelings and state of mind that the scene creator wishes the viewer to experience. That is, it is intended to be both subjective and objective. Other characteristics are discussed further below.

Figure 1:
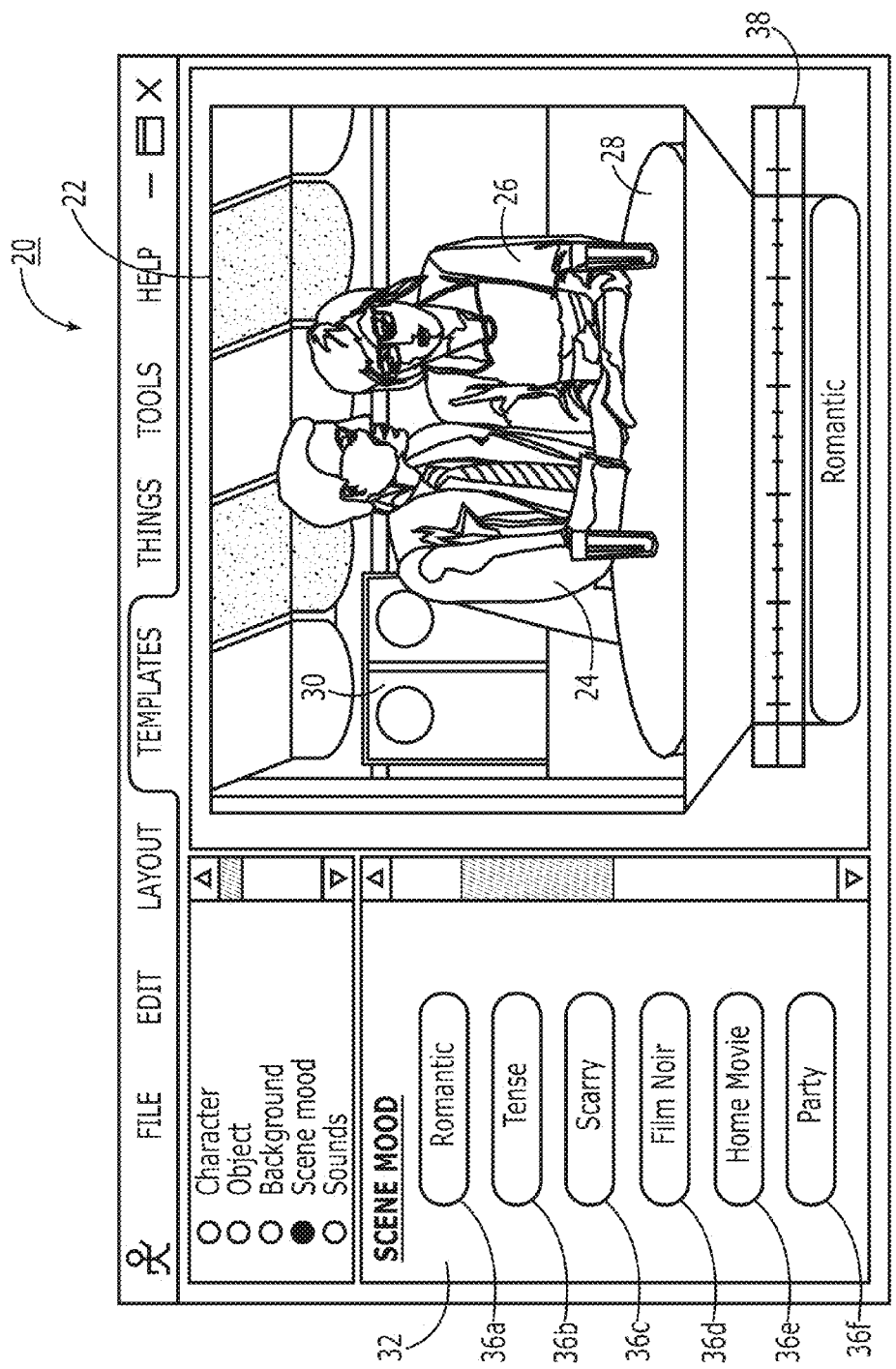
FIG. 1 is an illustration of an animation editor interface with a sample animation frame in which scene characteristic labels may be associated with a selected scene according to an embodiment of the present disclosure.

With reference to FIG. 1, there is shown therein an illustrative animation editor interface 20 with a sample animation frame 22. Animation frame 22 may be one of a series of frames which, when displayed in a chronological order, form a scene of animated content. Animation editor interface 20 may be a user interface for an animation application running on the user's (content creator's) computer. The animation application may have many scene design controls, and the layouts illustrated herein do not limit in any way the scope of the present disclosure or the claims thereto.

Shown in window 22 are two characters 24, 26, and various objects 28 (table), 30 (door), etc. For illustrative purposes, the scene shows characters 24, 26 at a restaurant or bar. The scene can be from one of many possible situations, each with a unique mood. While various terms may be used to refer to the feeling, emotional content, sensation, sentiment, state, and so forth a content creator wants to impart to a scene, for simplicity we use the term "mood" herein to represent this concept. As an example of mood, characters 24, 26 may be on a romantic date, such that the content creator wishes that the attributes of the scene convey a "romantic" mood. Alternatively, characters 24, 26 may be having a business meeting, with a professional or workplace mood. Or, characters 24, 26 could be having an argument, such that the scene might be best provided with a "tense" mood. While multiple elements of the scene may be directly controlled and animated (e.g., facial expressions, gestures, dialog, etc.) to establish the mood of the scene, it is possible to provide a user with a sense of the scene's mood simply from indirect controls such as lighting, camera angles, video focus, camera steadiness (or bounce), audio focus, and so on. While in many cases the mood is established by both direct and indirect control, it may be set exclusively or primarily by indirect controls if appropriate or desired.

According to one aspect of the present disclosure, a scene mood may be selected from a set of such moods, both pre-defined and user-defined, in an interface menu 32. A user may simply move the cursor 34 of the computer running the animation application over a mood "label" such as the "Romantic" label 36a, and click on label 36a to impart the frame with the attributes associated with the Romantic label. By way of example, these attributes may be relatively dim lighting, low camera angles, soft focus, slow zoom on speaking character, audio focus on speaking character, etc.

A mood label can be selected for any point during a scene so that the mood of the scene may be easily and quickly changed. This may be done, for example, by dragging the label 36*a* to a timeline 38, and stretching it cover the length of the clip. Once set, the mood label may remain from frame to frame until a new label is selected, a new scene is started, and so on. In this way, consistency of mood may be provided from frame to frame throughout a scene. Furthermore, this mood consistency can stretch across different scenes, such as if characters 24, 26 leave the restaurant shown in frame 22, and resume in a new romantic setting such as an after-dinner walk. For example, a second scene (not shown) may be added to interface 20, for example allowing the scene mood label 36*a* to be extended to the width (time-wise) of all or part of both scenes. In one embodiment, the mood settings may "auto-complete" in that certain assumptions can be built into mood label definitions, such as "unless set otherwise, the next scene's mood will match the current scene's mood. This auto-complete feature may form a control within the animation system and method (e.g., auto-complete is independent of which specific mood label is applied), or may form a control within individual mood labels (e.g., certain labels auto complete, others do not).

Figure 2A:
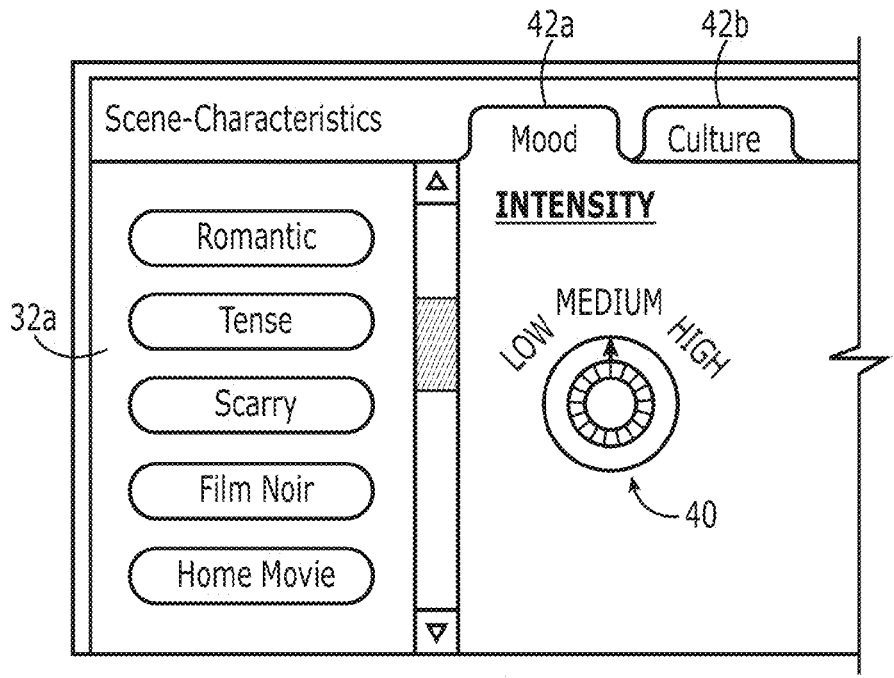
FIGS. 2A through 2D are illustrations of a portion of an animation editor interface in which various characteristics may be selected, including the intensity of a scene characteristic label, the culture label of scene, the animation style based on preference or on target audience, etc. according to an embodiment of the present disclosure.

In a variation of the above-described embodiment, shown in FIG. 2A, an additional control 40 may be provided to refine the characteristic selection made from menu 32*a* by selecting the intensity of the mood. While a "volume knob" embodiment is shown in FIG. 2, sliders, radio buttons, rotating drums, and pull-down menus are just some of other forms an interface that this control may take. Similarly, while three levels of gradation labeled low, medium, and high are shown in FIG. 2A, other numbers levels and labels are clearly within the scope of the present disclosure. Thus, the form of the control, and levels of gradation are not critical. However, by providing control of the intensity level of the mood, the content creator can build to a desired mood level, such as slightly romantic, very romantic, passionate, etc. Given that compelling movies (indeed any form of compelling storytelling) often take the viewer through one or more emotional "arcs", permitting the content creator to simply and easily control the rise and fall of the mood in the content provides a powerful tool for effective content creation.

An animation application may be provided with a number of predefined scene mood labels, which may be locked or may be user-modifiable. Likewise, an animation application may be provided with tools to assist a user in creating custom mood labels. One embodiment of such a tool is illustrated in FIG. 3. An interface window 44 is provided with a number of user-modifiable fields controlling scene attribute settings that define a scene mood label. For example, a field 46 may be provided for a user to apply a text name to the scene mood label being defined, or to select an existing scene mood label for editing. As with all scene mood labels, the text name for the label can have a meaning associated with the desired scene mood such that scene attribute settings being set are in accordance with a meaning associated with the label text (e.g., romantic, scary, etc.)

A great many different attributes may be associated with scene mood definitions, and controls permitting setting of the attributes may be provided in many different styles and forms, some of which being shown as settings 48 in FIG. 3. The following is a partial list for the purpose of illustrating the general concepts of the present disclosure, and shall not be read as limiting the scope hereof: number of cameras, camera-to-camera shift rate, which-camera to which-camera (viewpoint) shifting, camera stability, camera pan, camera zoom, camera focus, camera depth of focus, camera cropping, camera field of view, image filters, color filters, image effects (e.g., re-rendering), image blending, number of light sources, intensity of light sources, positions of light sources, colors of light sources, modulation of light sources, audio intensity, audio focus, audio transition (e.g., from character to character), room acoustics, etc., and variations within a scene of any one or more of the above.

In addition to attributes general to a scene, attributes affecting one or more characters or objects in the scene can be set by the selection of a scene mood label. For example, in a romantic scene, character movement may be made to be smooth and deliberate, and objects may be more stable. Or, in a scene labeled "scary", character movement may be made more jerky, and objects less stable and hence more likely to tip or fall. Individual characters or objects may be provided with the option of being affected by scene mood control labels or not, and labels themselves can be defined to affect or not affect the motion, interaction, etc. of characters and objects with each other or with the background.

In addition to scene mood, setting of a scene characteristic label can control other characteristics. In one example, setting a "region" label may set regionalization of a scene. A scene may initiate in the native language and with the native cultural icons and norms of the scene creator, such as American English. Currency is dollars, measurement units (length, weight, etc.) are English, characters are dressed as a typical American might dress for the scene, objects are what might be found in an American home, business, store or restaurant for the scene, etc.

Figure 2B:
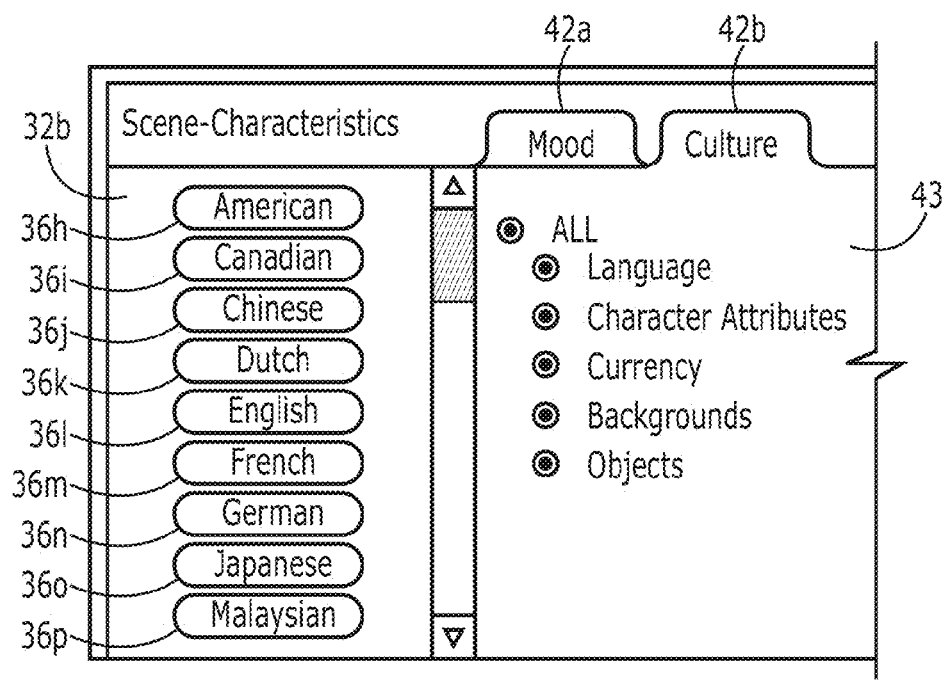
Figure 2C:
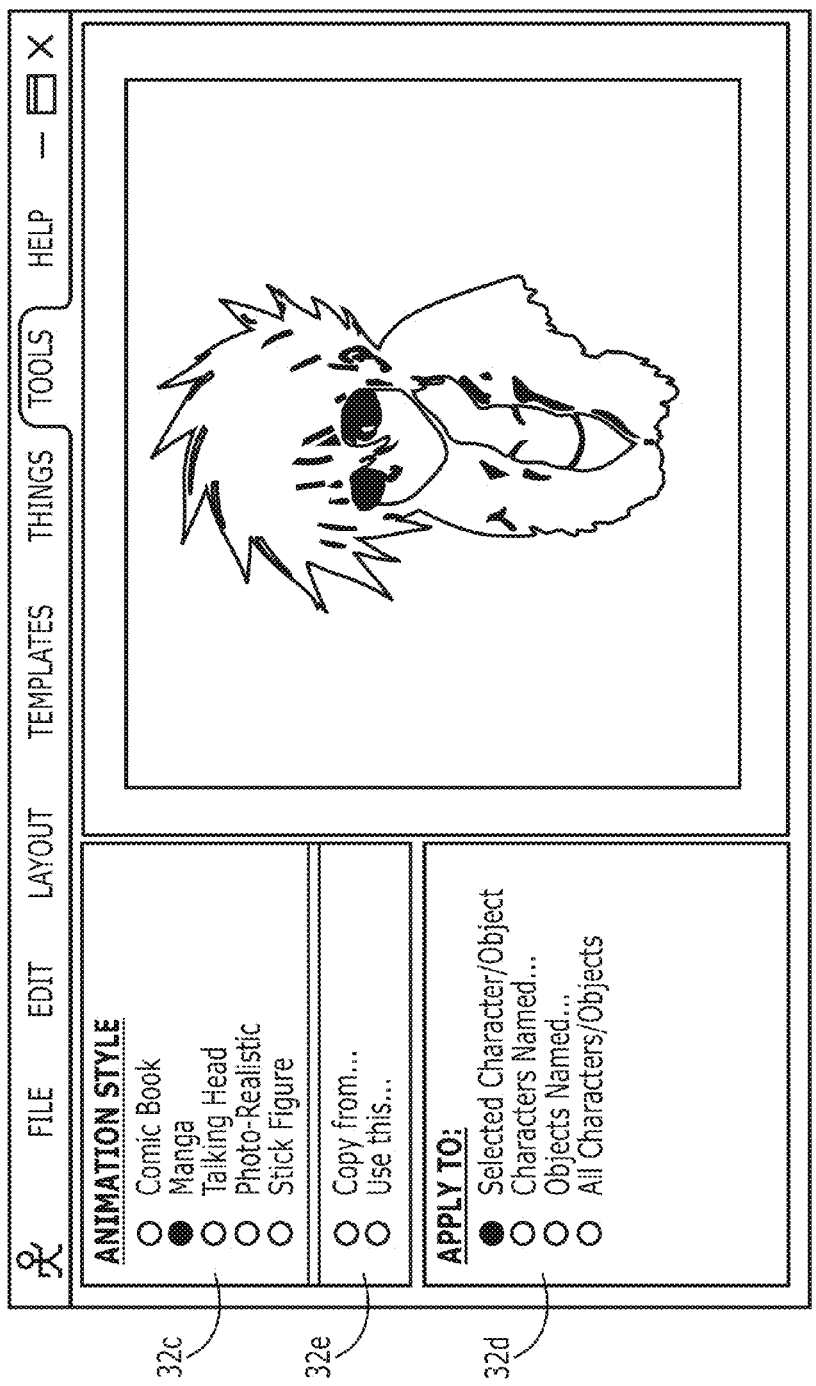

With reference to FIGS. 2A through 2C, a selection among the various types of characteristics may be enabled by menu items such as 42*a*, 42*b*, etc. While FIG. 2A is an illustration of a user interface with the "mood" menu item 42*a* selected, FIG. 2B is an illustration of a user interface with the "culture" menu item 42*b* selected. By selecting the "Japanese" label 36*o* (or other similar region label) from menu 32*b*, the system may quickly and efficiently replace aspects of the scene with more traditional Japanese aspects. Language translation may take place, for example by translating text from English to Japanese, then using a Japanese speech synthesis to voice the text. (See below for additional details of the voice synthesis process). Currency may be converted to yen, measurement units (length, weight, etc.) are metric, characters are dressed as a typical Japanese might dress for the scene, objects are what might be found in a Japanese home, business, store or restaurant for the scene, etc. These changes may be more than simply re-skinning characters and object, and translating text. Dynamic elements of the scene may also be converted to be regionally appropriate, such as cars driving on the left versus right side of the road, etc. And, cultural norms may be changed, such as hand gestures, methods of greetings, etc. Indeed, individual aspects of the culture label may be enabled or disabled in menu 43 to enable, for example, a Japanese character to have Japanese attributes in an otherwise American setting, and so on.

FIG. 3C is an illustration of a user interface which permits a user to select and control various attributes of the animation style. The user may select an animation style, such as "manga", from menu 32C, which will render a selected character, group of characters, or all characters in a scene according to that style. The user may also select a "copy from" function, and identify and source character or object form which the animation style and possibly other elements may be copied. As a further option, a user may select an image or file of a character or object and transform that file into a character or object to be used in the system. For example, a user selects a "Use this" control in menu 32*e*, and when prompted select a photograph of Abraham Lincoln then select "new". This action will create a file for use in the animation system that may be manipulated and used in the animation system described herein.

Figure 2D:
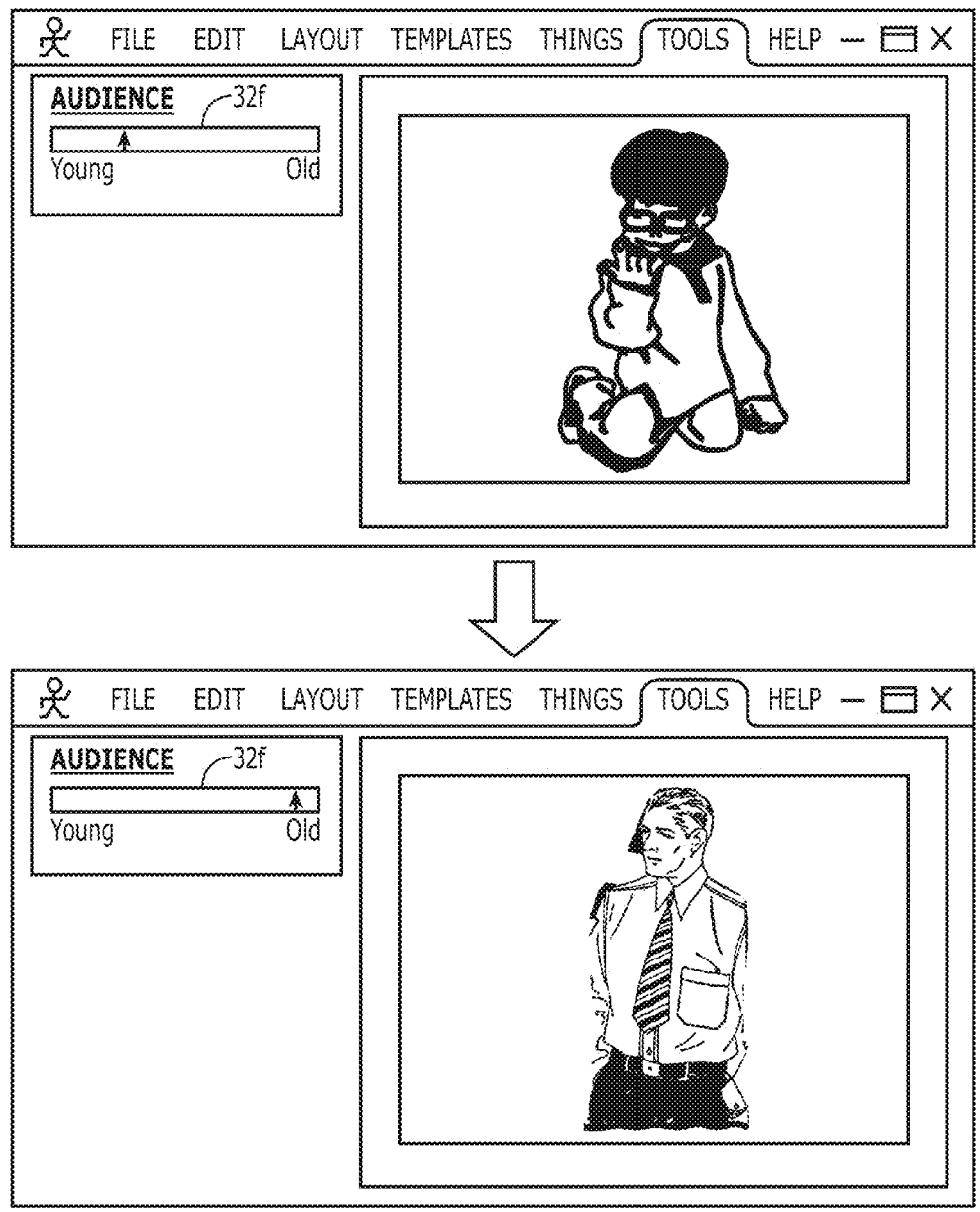

While the above description has been in terms of a user selecting desired character, object, background, and scene attributes, it is also possible for a user to select attributes tailored for a particular audience. It may, for example, be the case that a user anticipates that a particularly young or old audience will view the clip. Attributes of the clip may be changed wholesale to be appropriate for that target group. For example, a user interface 32*f* shown in FIG. 2*d* may be used to control the intended age of a viewer, where the control ranges from "young" to "old". This may produce many different results, such as the appearance of the character (as shown in FIG. 2D, from cartoon-like to more realistic), the rate of speech, the content of speech, the nature of humor, and so on. Many other audience controls (not shown) are also possible, such as location, cultural group, reason for viewing, capabilities of viewers, and so on. And while the audience control described above is in the context of content creation, this control may also be provided after the content is assembled, for example just prior to or during viewing of the content.

B. Scene Transition Labels

Figure 4:
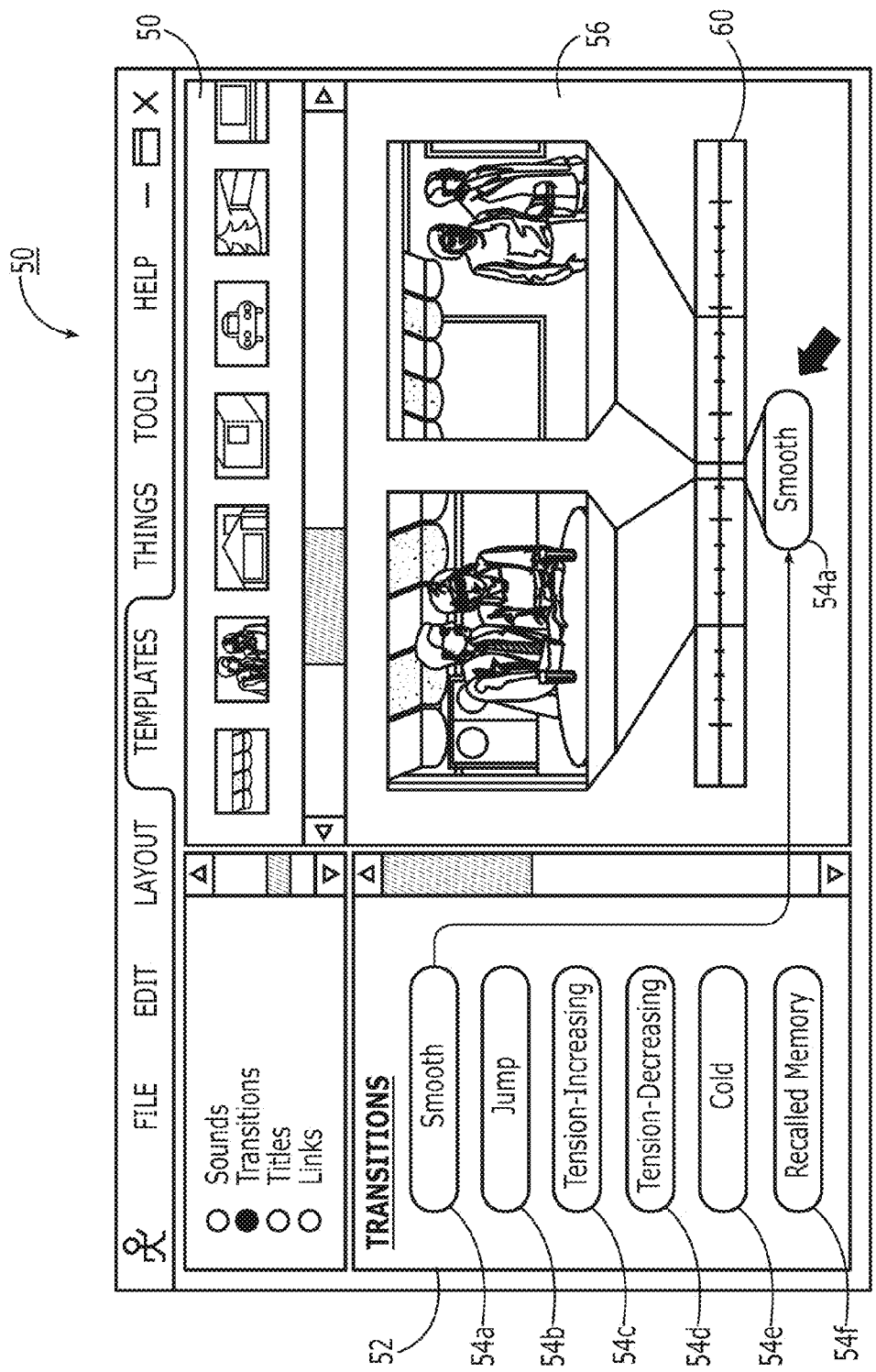
FIG. 4 is an illustration of an animation editor interface with two sample animation frames in which scene transition labels may be associated with selected scenes according to an embodiment of the present disclosure.

Scene-to-scene continuity may be also be influenced by a selected label. A typical movie is comprised of a number of scenes, with transitions from one scene to the next. While the drag-and-drop style of animation discussed above can be used to produce multi-scene movies, the process involves building a first scene, ending that scene, then building a new scene that simply follows the prior scene in time. There is no control over continuity between scenes, and no tools to automate the transition from one scene to the next. This is true of the scene itself as well as the behavior of the characters, objects, and backgrounds comprising the scenes. This is more akin to conjoining two independent clips than creating a cohesive set of transitioned clips. In contrast, the system and methods disclosed herein provide transition control to the creation of sequential scenes by providing scene transition labels. In addition to functional meanings (e.g., blend, fade-out, etc.) the scene transition labels may have titles which are tied to a temporal or an emotional meaning (e.g., jump to represent time passing between scenes, tension increase or decrease to represent building or decreasing tension between scenes, warm or cold to control those aspects of the end of one scene and beginning of the next, etc.) An editor interface 50 for employing scene transition labels is illustrated in FIG. 4.

Similar to the interface illustrated and discussed with regard to FIG. 1, interface 50 comprises an interface menu 52 for selecting a scene transition label 54 from a set of such labels, both predefined and user-defined. A clip composition palette 56 includes a number of scenes, which may be organized by dragging and dropping from another portion 58 of interface 50. A timeline 60 is provided allowing the content creator to organize the clips in a time-wise fashion. Menu 52 provides a number of transition labels 54*a*, 54*b*, 54*c*, and so on, such as smooth, jump, tension—increasing, tension—decreasing, cold, warm, and so on. One or more of these labels may, for example, be dragged from menu 52 into the regions between or overlap two adjacent clips. The width of the region between the end of one clip and start of the next clip may define the length of the transition. Or alternatively, a transition item in from menu 52 may have associated with it a defined transition time.

Application of a transition label as described above can have the effect of setting various scene controls such as lighting, camera angles, video focus, camera steadiness (or bounce), audio focus independently for each of the two scenes in the transition in order to provide the desired transition effect. For example, if characters travel from one room to another between scenes, a "smooth" transition may be selected, which automatically provides for reverse camera angles, consistency of lighting, consistency of character and object placement in the view, appropriate audio processing, and so forth. Alternatively, if there is a jump in time between scenes, a "jump" transition can be selected which can provide a pause at the end of one scene, a very short transitional break, then begin the next scene, etc.

An interface quite similar to that shown and described with regard to FIG. 3 may be employed to defined and edit the set of scene transition labels. Again, the name of the label should give the user a general idea about the effect of the setting of the attributes and the nature of the resulting transition. A partial list illustrating the general concepts of the present disclosure, which shall not be read as limiting the scope hereof, includes: cameras tracking, camera-to-camera shift rate, camera pan, camera zoom, camera focus, camera depth of focus, camera cropping, camera field of view, image filters, color filters, image effects (e.g., re-rendering), image blending, light sources from one scene running into the other scene, positions of light sources, light transition from one scene to the next, audio focus, audio transition (e.g., blending from one scene to the next), object position and state continuity, background position and state continuity, etc.

Furthermore, attributes affecting one or more characters or objects in the scene can be set by the selection of a scene transition label. For example, in a smooth transition, character movement may be made to be smooth and deliberate, and objects may be more stable. In a transition labeled "blend", character movement in a first scene may be compared to character movement in a second scene, and the nature of those movements adjusted so that one blends into the next. Individual characters or objects may be provided with the option of being affected by scene transition labels or not, and labels themselves can be defined to affect or not affect the motion, interaction, etc. of characters and objects with each other or with the background.

C. Spoken Language Input

The system and methods disclosed herein enable a content creator to create language segments (e.g., words) to be spoken by animated characters by receiving language segments spoken by a human, input from a pre-recorded audio source, generated by a speech synthesizer, etc. The input language segments are converted to text representation within the system. Prosodic attributes of the spoken language segment—intonations, rhythm, word lengths, accents, timbre, and other aspects of the speech—can be extracted and noted by an appropriate representation mechanism within the system. The text representation may then be used to generate synthesized speech in a voice provided by the system. The prosodic attributes extracted from the original spoken language segments may be factored into the synthesized speech, producing a more realistic and natural synthesized voice, a voice truer to the original speakers voice, and so on.

Figure 5:
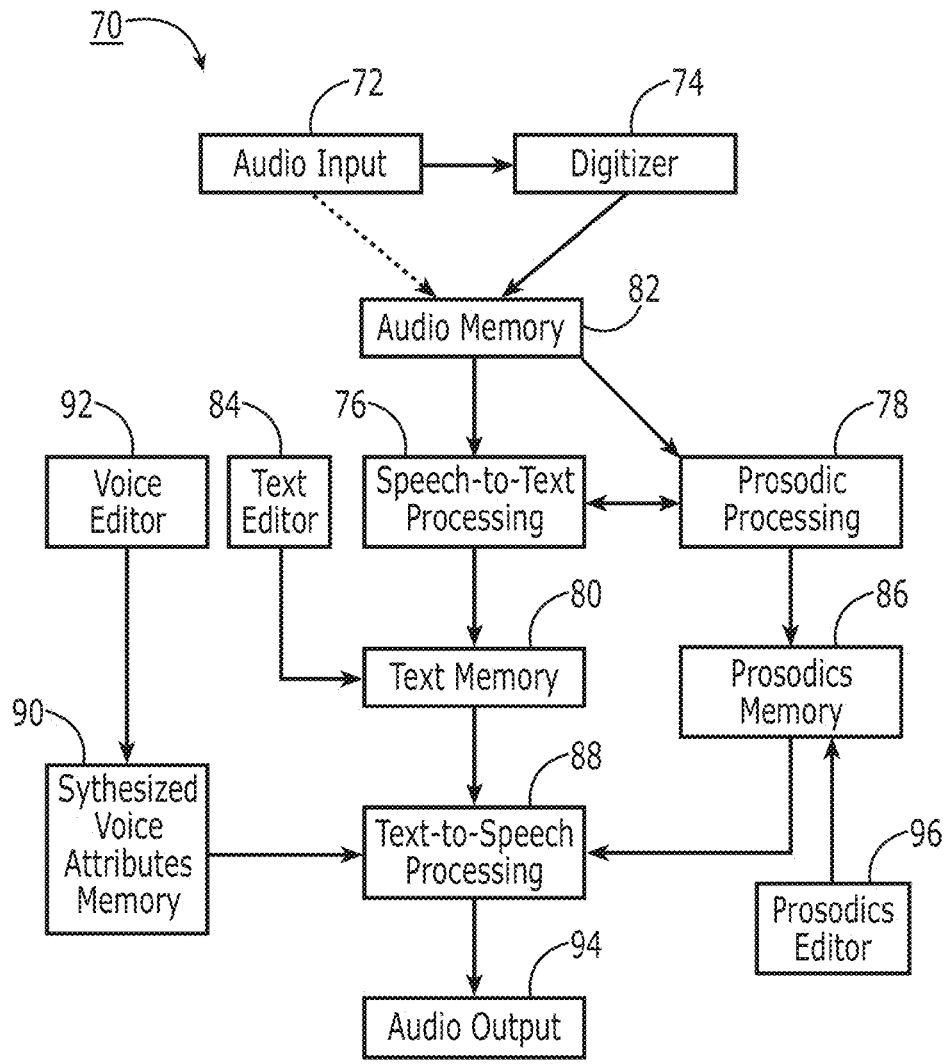
FIG. 5 is a schematic illustration of a system for using spoken language segments to enhance a synthesized voice according to an embodiment of the present disclosure.

With reference to FIG. 5, a system 70 for using spoken language segments to input those language segments for a synthesized voice is shown. System 70 comprises an audio input apparatus 72, which may be a microphone, text-to-speech device, digital or analog audio input jack, or other similar device for receiving contemporaneously spoken or pre-recorded audio. Typically, the input audio will be in analog format, so analog-to-digital processing takes place, for example at digitizer 74. The output of digitizer 74 is provided to speech-to-text processing apparatus 76 and to prosodic processing apparatus 78. Alternatively, if the audio input is purely digital, then that input may be provided directly to audio memory 82, as indicated by the dashed line representing an optional connection.

Speech-to-text processing apparatus 76 converts the spoken language segments to text form, and stores that text in text memory 80. Prosodic processing apparatus 78 analyzes the digitized speech, and extracts intonation, rhythm, word length, accents, timbre, word and syllable separation, syllabic stress, and other aspects of the speech that are not simply converted into text by speech-to-text processing apparatus 76, and stores those elements in prosodics memory 86. A text editor 84 may be used to edit the text in text memory 80, and a prosodic elements editor may edit the prosodic elements in prosodics memory 86. Ultimately, the text in text memory 80 may be spoken as synthesized voice by a text-to-speech processor 88. The voice may be one provided by the system's voice synthesis apparatus 90, which may be edited by a voice editor 92. Finally, the speech may be output, by an audio output device 94, such as an audio speaker.

Figure 6:
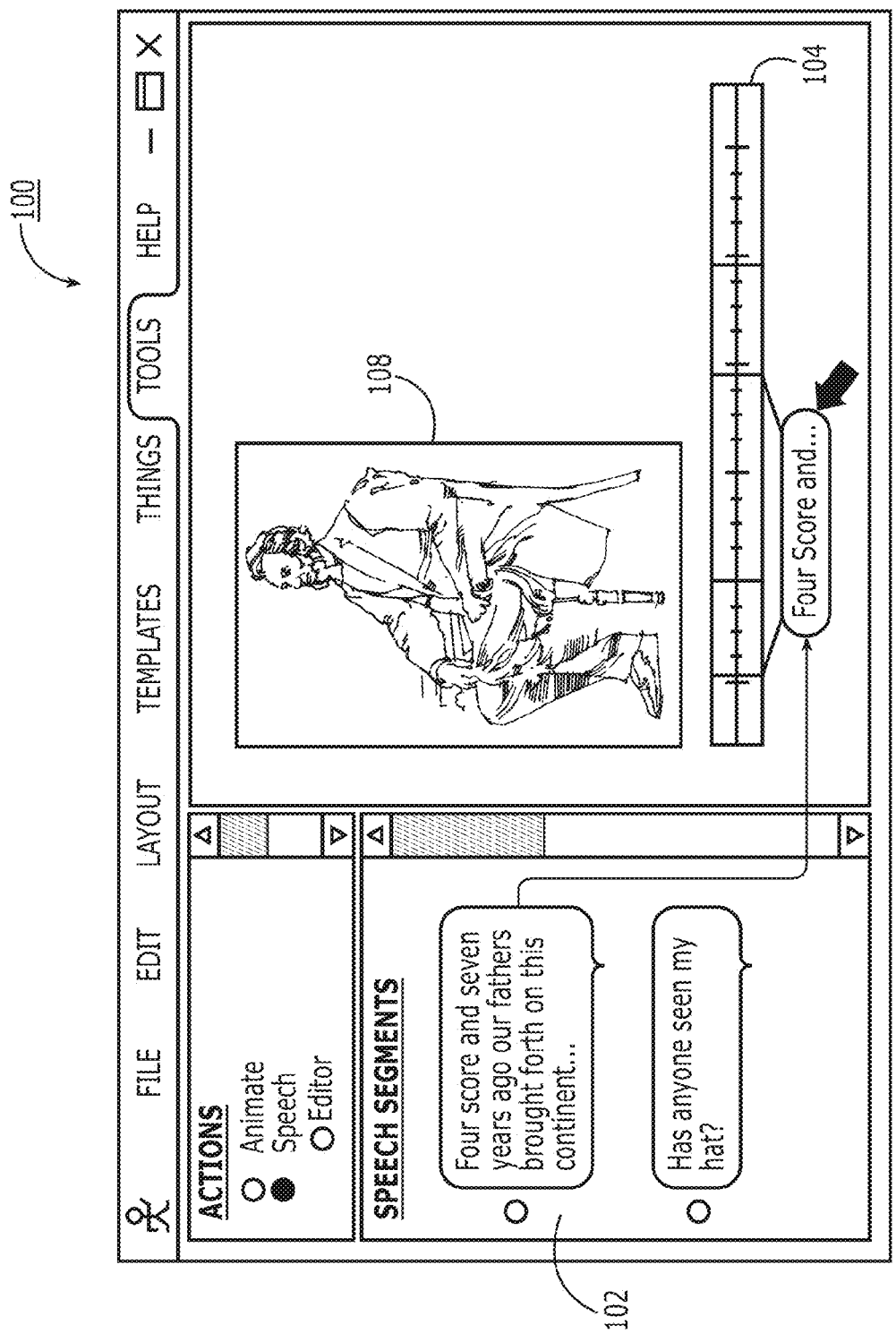
FIG. 6 is an illustration of an animation editor interface in which spoken language segments may be associated with character(s) in a scene, according to an embodiment of the present disclosure.
Figure 7:
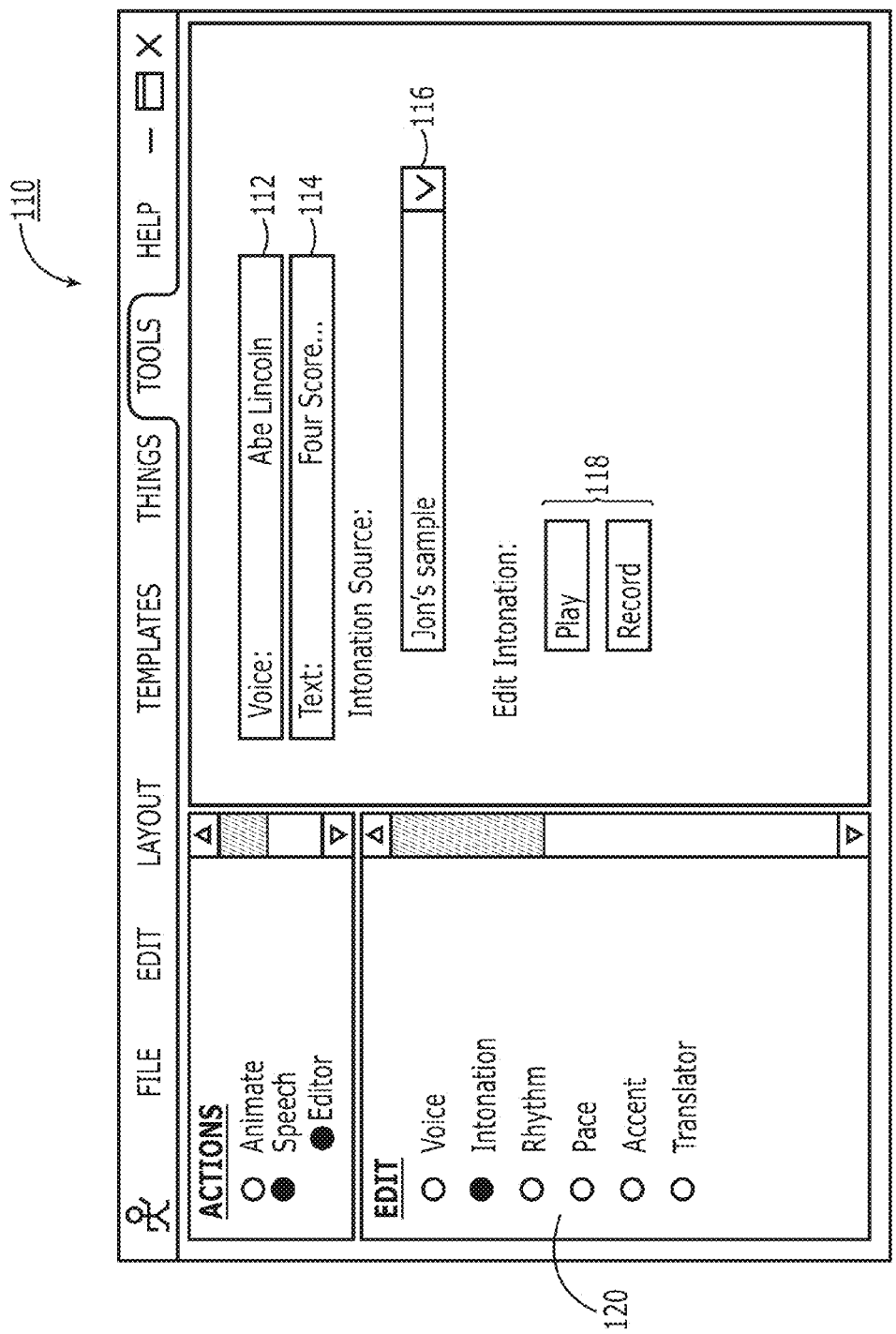
FIG. 7 is an illustration of an animation editor interface in which prosodic components of a spoken language segment may be associated with a digitized voice and/or edited, according to an embodiment of the present disclosure.

At this point, the content creator may have assembled a scene, with characters, objects, backgrounds, and interactions between those elements. This may be done in an interface such as shown at 100 of FIG. 6. In order to associate spoken language segments with a character in the scene, the content creator may drag the selected text from a menu 102 to a timeline 104, and adjust it to fit into a portion of the scene indicated by frame 108. The text elements shown in menu 102 represent spoken language segments from text memory 80 (FIG. 5). The text elements have associated with them prosodic elements from prosodics memory 86, as well as a selected synthesized voice and other user-selectable audio characteristics that may be accessed in an editor window 110 shown in FIG. 7.

In one embodiment, window 110 indicates the voice being used 112 (which may be selected from synthesized voices provided by the system in a different interface), the text file 114 to be voiced by the character, and the source 116 of the intonation file that will modify the synthesized voice, such as that extracted by the prosodic processing apparatus 78 from the digitized human voice input to audio input 72 of FIG. 5. If needed, the intonation, rhythm, etc. may be edited either by re-recording and re-digitizing the voice, or by other known interface and control 118, 120 to these elements.

It is worth briefly noting that while the above has assumed that a live human speaks the desired text, many other forms of voice input may be employed. For example, it is possible to input spoken text from audio recordings, from live orations, from spoken language received via the radio, Internet, etc. This may be a useful feature when wanting to replicate the spoken mannerisms of a celebrity, historical figure, or the like, while doing so with a synthesized voice, for example in an educational context. Another use may be utilizing stored language clips to synthesize a person's natural spoken voice following onset of an impairment that limits a person's ability to speak.

While many different or additional methods of associating text, speaking voice, and prosodic elements may be employed, the general concept is that digitized voice is converted to text, the prosodic elements extracted from the digitized voice, the text and/or prosodic elements edited if necessary, then a synthesized voice, for example other than the original speaker's voice, reads the text with the prosodic elements overlaid to form more natural sounding synthesized speech. Fast and more natural content entry for voice synthesizing, as well as the ability to introduce more natural and realistic voice characteristics is provided. Furthermore, many different contributors can contribute to the content spoken by a character (e.g., many different people record their spoken language segments), with a single synthesized voice and a single set of prosodic elements applied thereto.

It will be appreciated that having access to the text format of the spoken language segments provides the added opportunity to examine that text for elements that may assist in rendering of the animated characters, objects, and backgrounds. For example, certain text may trigger a change in appearance of a character, a change in state of an object, and/or a change in background of a scene. For example, if the text that a character is to be animated speaking says "I am going put on my hat", the system may pick up on "put on" and "hat", and animate the motion of the character putting on his hat. Many cues may be obtained from the text to assist with the animation process, such as selecting the target with which a character interacts, selecting appropriate backgrounds, directing character motion, action or interaction, control of regionalization, identification of mood or transition characteristics for label identification or application, and so on.

D. Multiple Contributors and/or Editors

Figure 8:
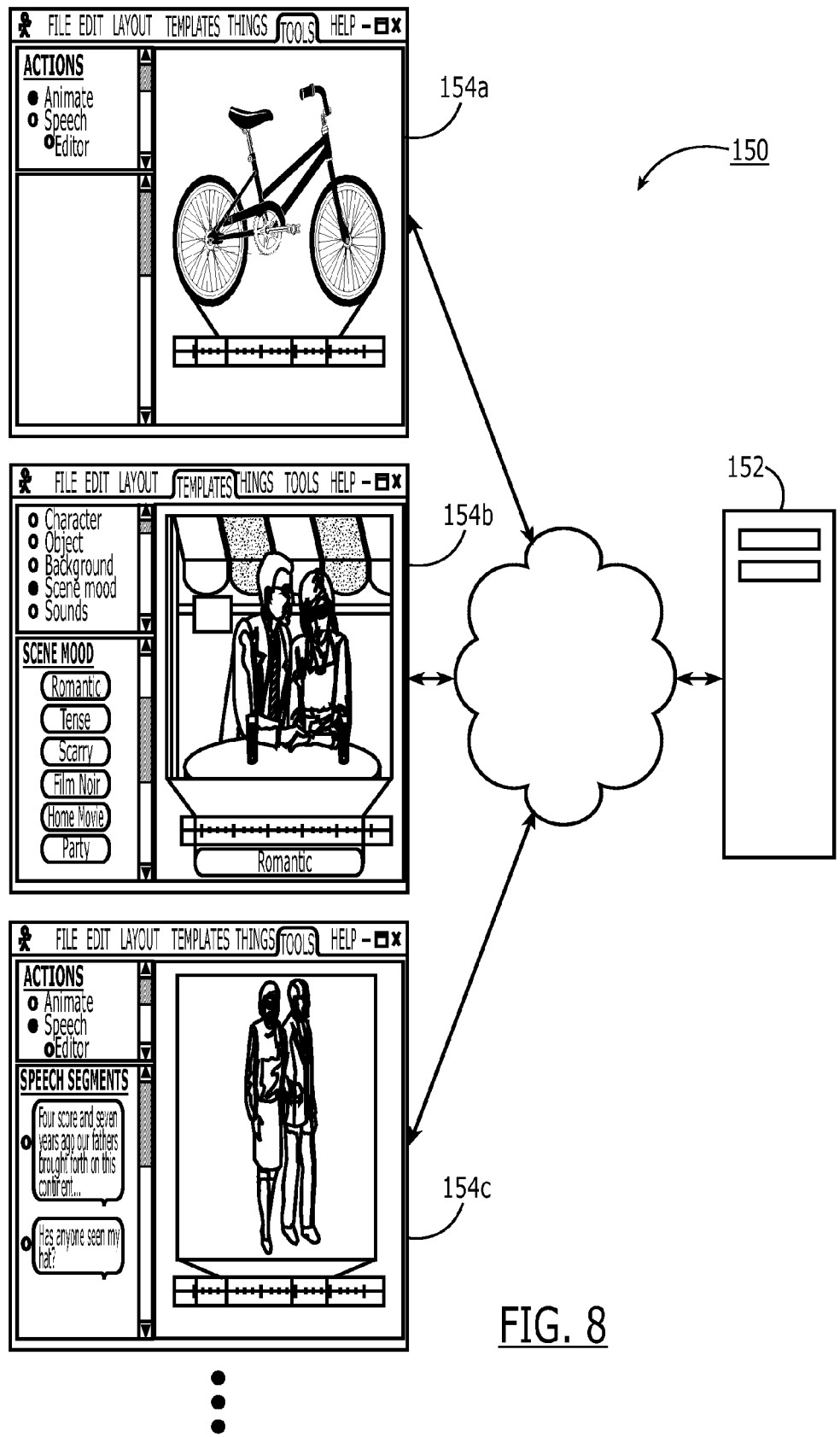
FIG. 8 is an illustration of system for creation of animated content in which multiple contributors can contribute content to the creation of a scene or complete animated work product according to an embodiment of the present disclosure.

Similar to the ability for multiple speakers to contribute to the content spoken by a character discussed above, multiple contributors can contribute content to the creation of a scene or complete animated work product. In an embodiment 150 illustrated in FIG. 8, the system and methods described herein may be resident on a server 152 to which multiple client devices 154*a*, 154*b*, 154*c*, etc. are communicatively connected via a local area network, wide area network, the Internet, etc. In such an arrangement, multiple users can simultaneously be contributing elements of scenes or whole scenes to a project.

For example, one contributor may author and contribute a scene relating to how two people first meet. Another to how these two people get to know one another. And still another to how the two people get along together after some time. The entire project may be scripted, and each contributor may create his or her scene following the script. Or, some or all of the project may be unscripted, and each contributor creates their vision of the slice of a slice of the project. The various scenes may then be assembled together in a simple manner as described above. Labels for scene moods and scene transitions may then be applied, as described above, to blend the various scenes into a consistent and cohesive product, if desired.

In addition to content creation for some or all of a scene's action, contributors may contribute objects, backgrounds, behaviors of characters or objects, spoken language segments, titles or credits, sounds, music, and may contribute new mood labels and transition labels, as well as a wide array of additional elements to a project. There may be one individual or group individuals who have final editorial authority for the piece, or the piece may be a product of collective effort.

E. Animated Element Libraries

In addition to the ability for several creators to contribute elements to a product, creators may import elements to a scene that may originate outside of the animation system itself. Elements such as characters, objects, backgrounds, behaviors of characters or objects, spoken language segments, titles or credits, sounds, music and so on may be imported and placed in scenes. In addition, users of an animation system may share custom controls for the system, such as custom scene mood labels, scene transition labels, system-specific character or object behaviors, etc.

Elements may be imported (or exported) by way of file transfer protocols, email of files, accessing a warehouse of elements, and so on. In one embodiment, a warehouse of elements provides a searchable database of objects that may be downloaded, some for free, others for a fee. To facilitate this, elements are provided with tags that indicate keywords, features, and other data, which allow for efficient categorizing and searching of elements. Some elements are sprite-like, and are simply rendered into a scene. Other elements are more dynamic, and have behaviors that are imported with the element and added to the content creator's palette of characters, objects, and backgrounds.

In addition to the ability to import and export elements, it is also possible to import and export entire clips, entire scenes, and portions of a scene. Uploading these to, and downloading these from a central repository is a simple and convenient way to provide access to clips, scenes, and portions of scenes for sharing and to further simplify content creation. This is different from sharing clips, scenes, and portions of scenes simply for viewing, as the repository makes these available for use by other creators within their own content. For example, a creator may create a scene of a flowing river, with animated birds, insects, swaying trees, etc. for a clip she is creating. She may offer this scene for others to use by uploading it to the scenes warehouse. She may apply tags to the scene such as a descriptive title, keywords, whether the scene is available for free or for fee, and so on. Other content creators may then search the scenes warehouse for scenes of interest, and download scenes therefrom for inclusion in their own scenes and clips.

Figure 9:
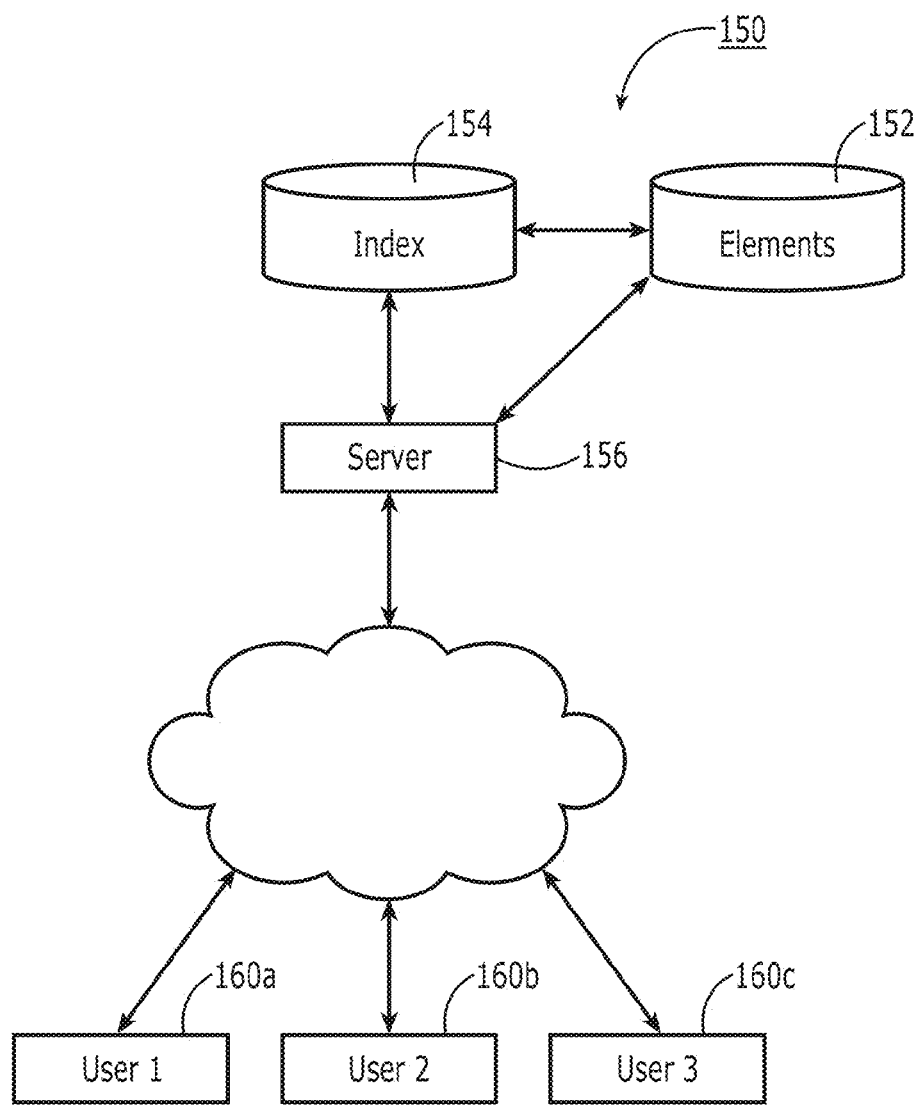
FIG. 9 is a schematic illustration of a system for uploading and downloading animated content elements according to an embodiment of the present disclosure.

FIG. 9 illustrates a hardware arrangement 150 enabling sharing of elements, scenes, clips, etc. System 150 comprises an elements memory 152 and database index 154. Server 156 is communicatively coupled to both elements memory 152 and database index 154. Server 156 may be accessed by local area network, wide area network, the Internet, etc., by one or more of a number of user computers 160a, 160b, 160c, who may search and request downloading of elements, scenes, clips, etc., and who may also upload to elements memory 152 elements, scenes, clips, etc.

Figure 10:
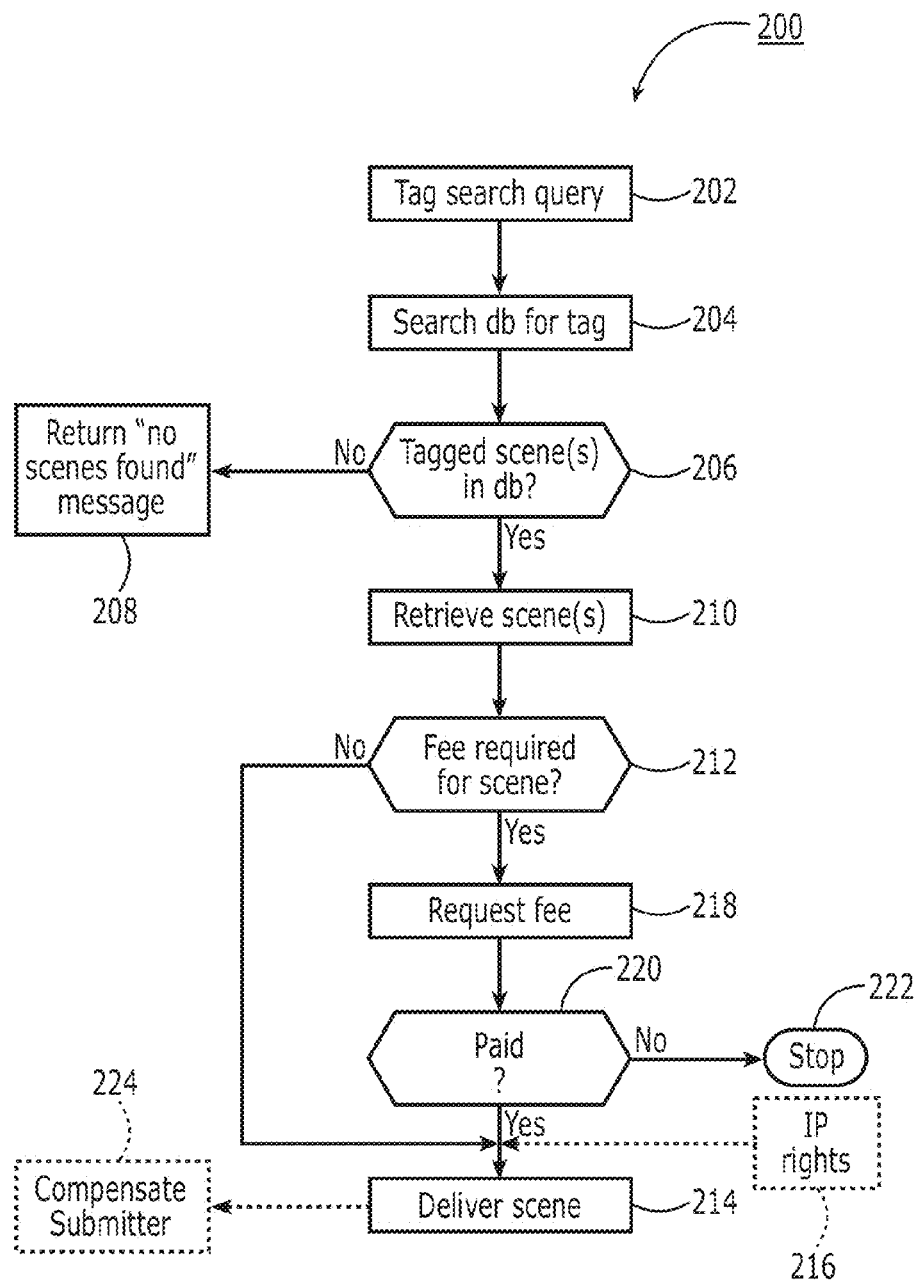
FIG. 10 is flow chart illustrating certain steps in a method for sharing animated content elements such as may be utilized in a system of the type illustrated in FIG. 9.

FIG. 10 illustrates the steps of one embodiment 200 for sharing such elements, scenes, clips, etc. Embodiment 200 first comprises receiving a plurality of video elements for storage in an element memory 152 (FIG. 9). Each video element has a content tag associated therewith that identifies the general content of the video element. Each video element may also have associated therewith a price tag indicating the price associated with downloading and using the video element, as well as an intellectual property (IP) rights tag identifying a statement of intellectual property rights limitations on use of the video element. As used herein, intellectual property refers not only to patents, copyrights, industrial design rights, and trademarks, but also contractual and license rights, and any other rights according to which use limitations, attribution, and/or direct or indirect compensation for use may be associated.

When a user wants to retrieve an element for use in a scene, a search of all tags is input at step 202, and a search of index 154 (FIG. 9) is performed at step 204, permitting identification of a desired video element by tag. If no element is found at step 206, an appropriate message such as "no scenes were found" is returned to the requester at step 208. If an element is found, it is retrieved at step 210. The price for downloading the element, if any, is determined at step 212 from said price tag associated with the video element. If the scene may be used free of charge, the scene may be provided to the requester at step 214, where it is added to the appropriate palette of characters, objects, backgrounds, labels, text, sound etc. In certain cases, an optional additional limitation of an IP rights agreement at step 216, discussed further below, is performed prior to downloading the element to the user. If a fee is required, the requester is alerted at step 218. If the fee is successfully collected at step 220 the scene may be provided to the requester at step 214, subject to the optional IP rights agreement at step 216. If the amount is not collected, the process stops or restarts so the requester can search for a different element.

As a first optional step, it is possible to require agreement to one of a plurality IP rights statements, at step 218, prior to delivery of a video element. Element may be tagged with an indication of the form of license or other IP rights associated with that element. A statement may then be provided to the requester that the use of the element is subject to agreement to be bound to the IP rights statement associated with that element. The element is then delivered for use only if agreement to be so bound is received.

As another optional step, it is possible to track, whether by tag, index, or otherwise, when and how much compensation to a submitter of an element is due for the downloading of that element, as shown at step 224. When an element is downloaded, and compensation received, the system may automatically initiate a method that results in appropriate payment to the submitter.

Figure 11:
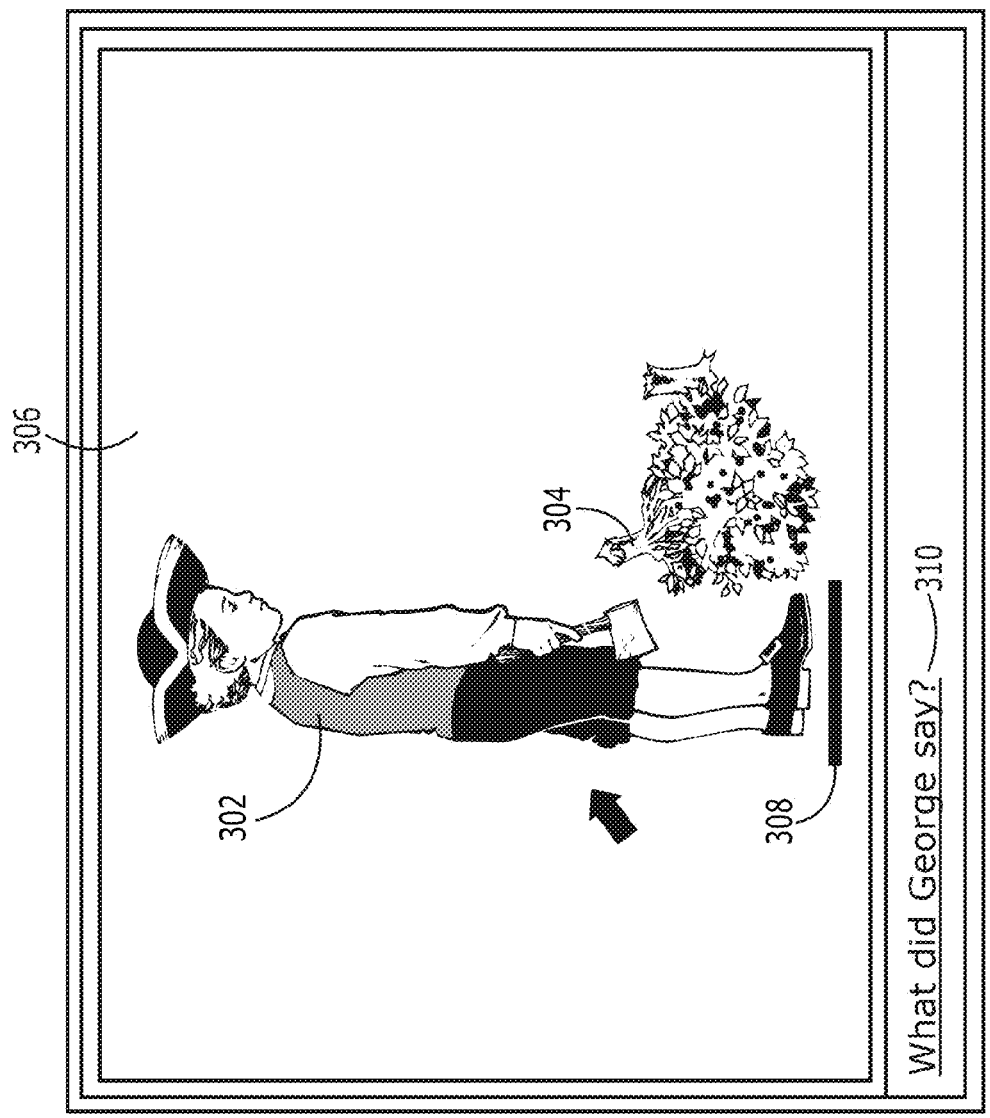
FIG. 11 is an illustration of a scene showing linked characters as well as an interactive question according to an embodiment of the present disclosure.

In addition to tags or as an alternative thereto, characters, objects, and backgrounds may each carry an identifying URL and/or a link, similar to a hypertext link. This facilitates following a link to the characters, objects, and backgrounds, within the system, such as scene or clip navigation. In creating a scene, a user may click on a character, object or background and be taken to a web page which provides metadata such as the "name", history, ethnicity, "age", cost to use, likes and dislikes, and other attributes of the character, object or background. For example, with reference to FIG. 11, if a character represents an historical figure (such as Abraham Lincoln, 302 (which may for example be indicated as a linked element by the underlining 308 when the cursor hovers over the character), clicking the character may take the user to an on-line dictionary or Wikipedia entry, Google search, etc., about that figure. If the character is speaking text, it can be possible to stop the clip and link by clicking on the character to an image or text file of the complete text (such as for a famous speech, class lecture notes, etc.). In addition, the user may click on the character 302, an object 304 or a background 306 and be taken to a web page with similar additional characters, objects, and backgrounds, such as from the same creator or publisher. These links may be accessible during the authoring process, or may be accessible in the final scene or clip (as shown in FIG. 11).

In one application of the linked object embodiment described above, a character, object or background in an animated scene may be associated with a question (such as question 310), and the link associated with an answer to that question. An educational tool (e.g., vocabulary, foreign language, history, math, etc. lesson or test), game (e.g., treasure hunt, hidden object, etc.), and other interactive animation may thereby be provided.

Figure 12:
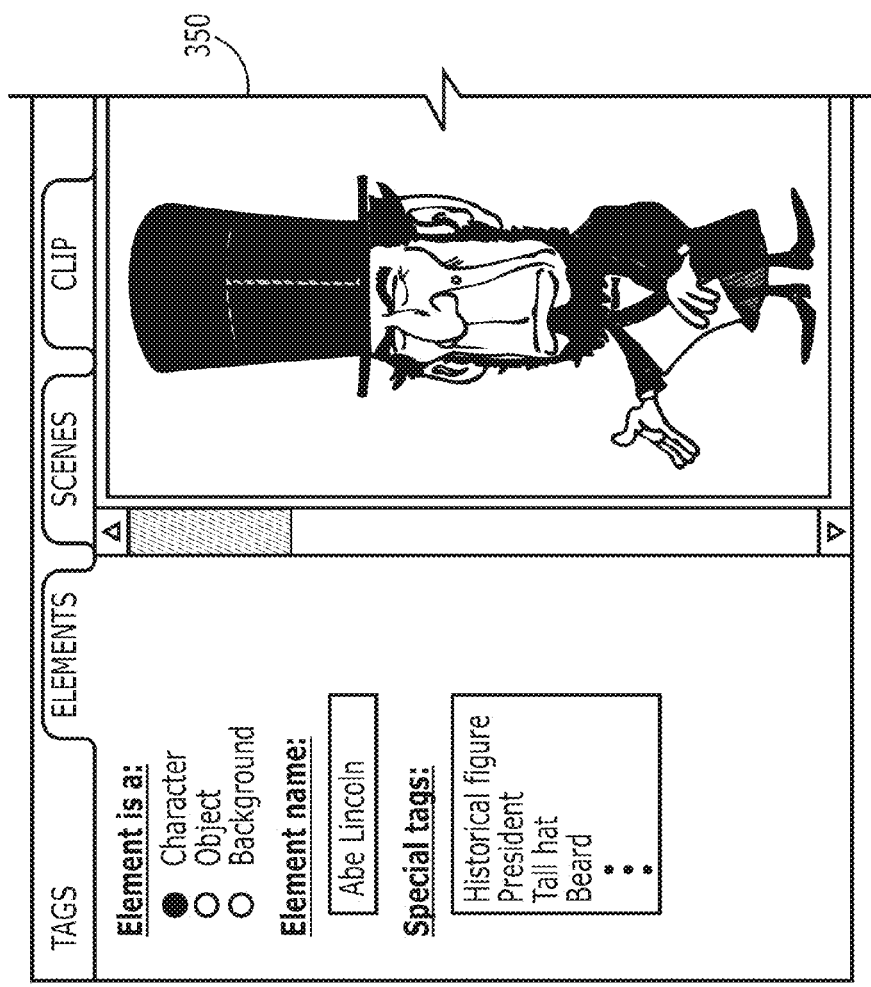
FIG. 12 is an illustration of a user interface for viewing, adding, and editing tags associated with a character, object or background according to an embodiment of the present disclosure.

As discussed above, elements of a scene may be tagged, for example using an interface 350 shown in FIG. 12. The user interface 350 allows associating a number of different tags with a character, object or background, allowing for organizing, filtering, sharing, searching, and other meta-level manipulation of elements.

Figure 13:
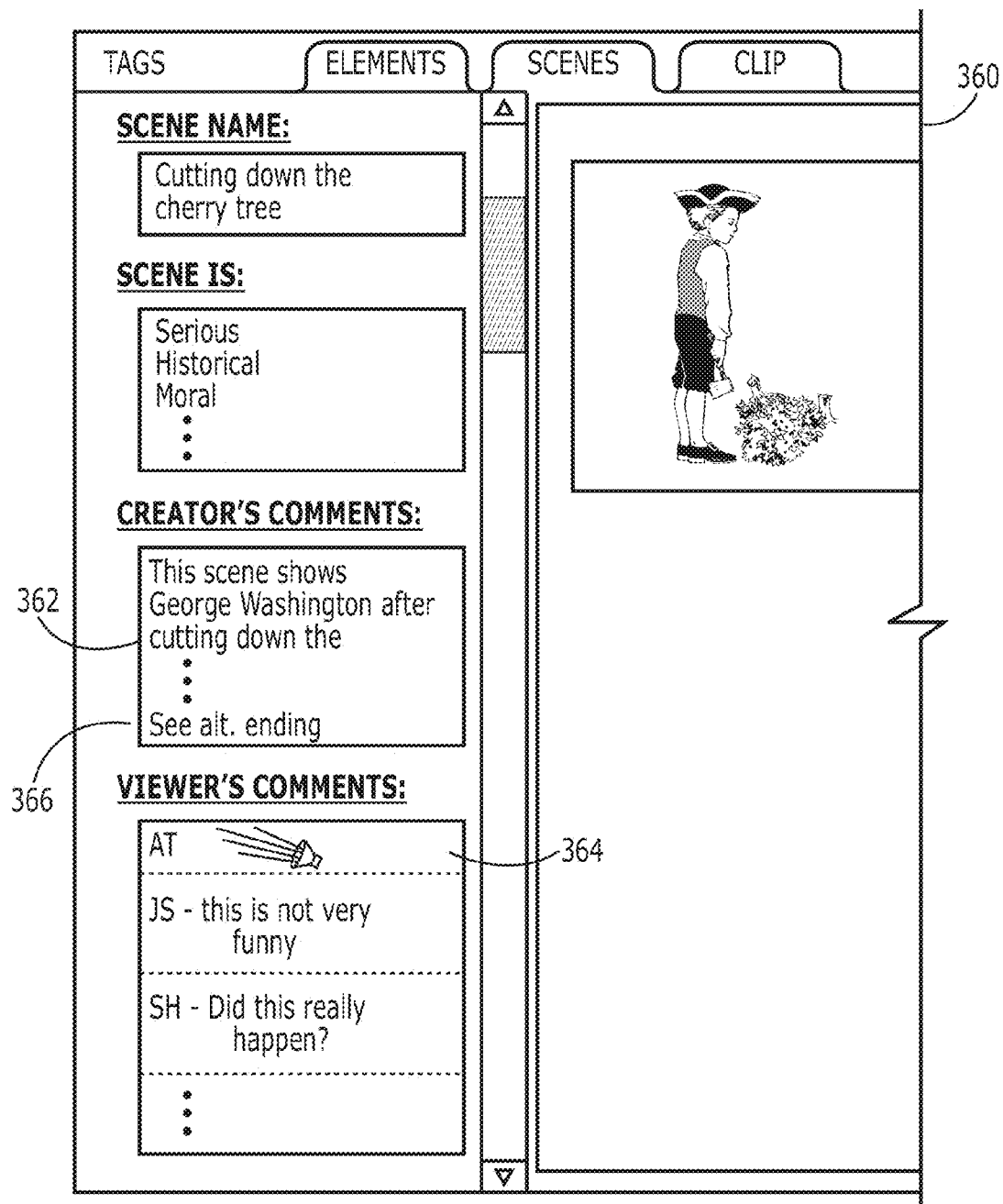
FIG. 13 is an illustration of a user interface for viewing, adding, and editing tags associated with a scene according to an embodiment of the present disclosure.

However, according to another embodiment of the present disclosure employing tags, a scene or clip may be augmented with data linked to the tag, for example using an interface 360 shown in FIG. 13. Tags may link to a creator's comments about a scene 362, similar to the "director's cut" found on certain digital video disk (DVD) versions of feature films. These comments may be text, audio 364, links 366 to additional content (such as alternative scenes, characters, objects, backgrounds, etc.). The tags may be provided at a point in time in a scene inviting comments from a viewer, which may be appended to the tag or otherwise associated with the tagged point in time of the scene. Such comments may provide data to the creator to assist with the creation or distribution process (e.g., comments on quality, accuracy of setting, translation, objects, etc.) The tags may also be used to identify like portions of scenes, for example to determine common features of the scenes. For example, scenes tagged as "historical" might be collected using the tags. The collected scenes can then be treated as a group, for example analyzing the group of scenes to determine which elements the scenes have in common that may render the scene historical.

Figure 14:
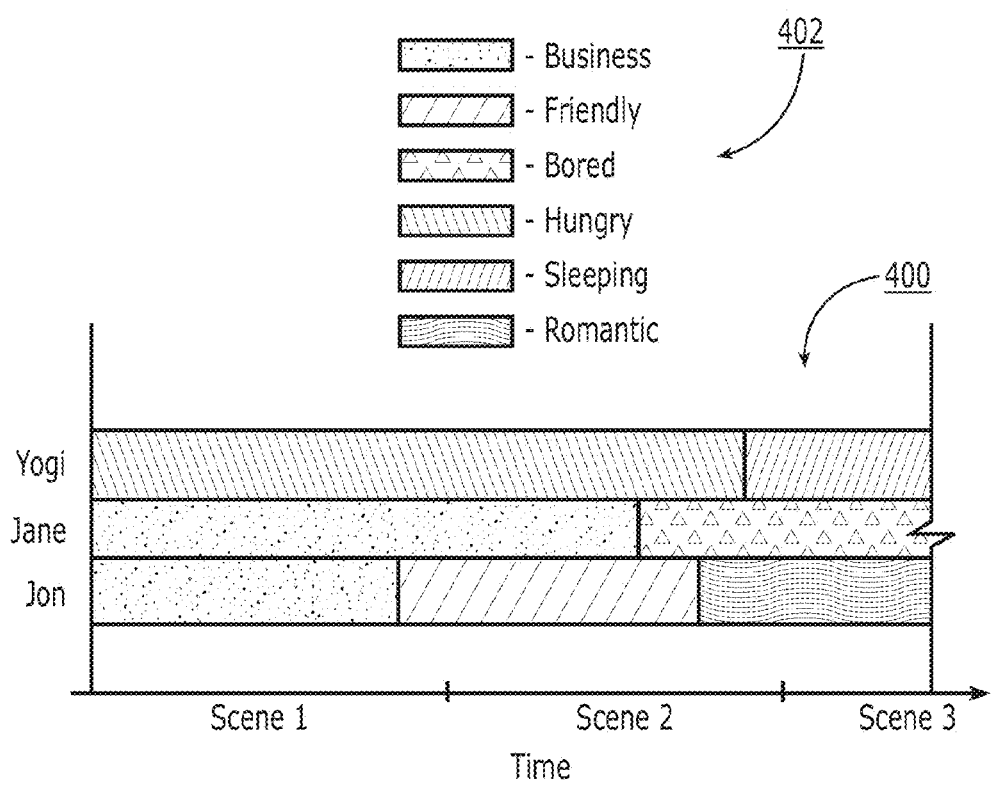
FIG. 14 is an illustration of a mood map showing moods of various characters in terms of time, and permitting comparison of the mood of one character at a point in time with that of another character at that same point in time according to an embodiment of the present disclosure.

In one embodiment of the present disclosure, a map or graph may be produced and used to visualize the moods or the like of various characters over the course of a scene or clip. With reference to FIG. 14, one example of such a map 400 is shown. Along one axis is time. Along the other is a list of the characters (or even objects) in the scenes or clip of interest. Labels applied to the characters may be shown in the graph to illustrate moods in terms of time and to compare the moods of one character at a point in time with that of another character at that same point in time. While a simple key 402 is used in FIG. 14 to indicate the different moods, fading, width of bars, and other visual cues may be used to show more detail about changing moods with time, again as derived from the various labels applied to characters, objects, and transitions by the creator. Labels may also be applied or changed in the map interface, for example by dragging the transition point between two moods from one location to another, by dragging and dropping labels onto the timeline for a character, etc. Inferences for how characters might act or react can be derived from the map, such as rebuffing of a romantic overture, laughing at what a character says or does, and so on. This may assist the creator in developing a scene script, and may in fact be the basis for automated animation of elements of a scene or clip.

There are myriad applications for scenes and movies produced by the systems and methods described above. Without limiting the scope of the present disclosure or claims herein, examples of applications include: entertainment (e.g., free/feature length, long/short formats); education (e.g., use in school, for children, use by children, for assignments, etc.); safety, industrial, training; modeling (e.g., construction, mechanical design, user interface); medical; legal (e.g., courtroom animated exhibits and reenactments); journalism; (living news feeds, periodicals); reference (e.g., product use guides, kiosks, interactive maps, animated on-line help desk with voice-to-voice hiding regionality of help desk; transportation (e.g., remote/pilotless operation), retail (e.g., on-line store fronts), advertising, etc.

In one example, the systems and methods disclosed herein form the basis of an on-line animated help center product, which renders a live remote assistant as an animated video character. The system includes an interface for permitting a user, who may have a first regional dialect, to interact with the live remote assistant who has a second regional dialect that is different from said first regional dialect. An interface is provided for receiving an inquiry from the user and providing the inquiry to the remote assistant. An interface is also provided permitting the remote assistant to provide a response to the inquiry. The system accesses a database of prerecorded response phrases, each prerecorded response phrase having associated therewith specific language attributes extracted from a response voiced in the first regional dialect. An analyzer analyzes the response and determines whether the remote assistant's response matches a prerecorded response phrase in the database, and if so, it retrieves the specific language attributes extracted from the response voiced in the first regional dialect. A converter converts the assistant's response to text format, and a speech-synthesizer converts the text-formatted assistant's response into a speech-synthesized spoken language segment voiced in the first regional dialect.

A modifier circuit modifies the speech-synthesized spoken language segment with the specific language attributes extracted from the response voiced in the first regional dialect. The speech-synthesized spoken language segment modified with the specific language attributes is associated with the animated character to simulate the animated character speaking the speech-synthesized spoken language segment. Finally, the animated character speaking the speech-synthesized spoken language segment is provided as a time-appropriate response to the user's inquiry.

The animated help center assistant disclosed above is just one example of how the systems and methods disclosed herein might apply to the above-listed applications. It will be readily apparent that many additional applications are possible and contemplated hereby, indeed to many to practically and comprehensively list.

While the foregoing has focused on downloading elements to a user's computer, other embodiments such as unlocking additional elements, and making additional elements available when the animation is operating on a server computer are also within the scope of the present disclosure.

In most cases, the final content created with the above system and methods is rendered as a digital data file in one of a variety of video formats. The digital data file may be played by an appropriate viewer such as Windows media player, may be posted to a sharing site such as YouTube, may be directly send to others such as by email, may be added to a user's website or blog for viewing through a browser interface, etc.

The embodiments described, and hence the scope of the claims below, encompass embodiments in hardware, software, firmware, or a combination thereof. It will also be appreciated that the methods, in the form of instructions having a sequence, syntax, and content, of the present disclosure may be stored on (or equivalently, in) any of a wide variety of computer-readable media such as magnetic media, optical media, magneto-optical media, electronic media (e.g., solid state ROM or RAM), etc., the form of which media not limiting the scope of the present disclosure. A computer reading said media is operable to either transfer (e.g., download) said instructions thereto and then operate on those instructions, or cause said instructions to be read from the media and operate in response thereto. Furthermore, devices (e.g., a reader) for accessing the instructions on said media may be contained within or connected directly to the computer on which those instructions operate, or may be connected via a network or other communication pathway to said computer.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A computer-implemented method for creating animated video content within an animation system, comprising:
    selecting, from a set of scenes stored in a computer-based scene memory, a first scene into which one or more characters, objects, or backgrounds are placed, said first scene comprising a plurality of scene attribute settings, wherein said plurality of scene attribute settings comprise audience attribute settings related to age of audiences;
    providing a timeline on a computer interface of said animation system into which said first scene is inserted in a time-wise manner among other scenes;
    selecting on said computer interface of said animation system a scene characteristic control label, from a set of scene characteristic control labels, in which said scene characteristic control label is scene mood;
    assigning said scene characteristic control label to said timeline on said computer interface overlaying at least a portion of a length of said first scene;
    said assignment of said scene characteristic control label to said timeline setting said scene attribute settings for said portion of the length of said selected first scene in accordance with a meaning associated with said characteristic control label;
    selecting on said computer interface of said animation system an audience attribute for setting an age appearance of said one or more characters;
    displaying said first scene having said scene attribute settings set in accordance with said characteristic control label and said audience attribute settings; and
    displaying on a map interface given scene mood of a character or object in said animated video content as a function of time per scene of said animated video content, wherein said map interface maps to said timeline on said computer interface, and in which said mood of said character is compared to the mood of another character at various points in time.

2. The computer-implemented method of claim 1, wherein said set of scene characteristic control labels describe a scene characteristic selected from the group consisting of: scene mood, scene region, and scene animation style.

3. The computer-implemented method of claim 1, further comprising setting an intensity control, to thereby set levels of said scene attribute settings for said selected first scene.

4. The computer-implemented method of claim 1, wherein said scene attribute settings are selected from the group consisting of: scene lighting, view or camera angle, focus, scene layout, audio volume, background audio, response characteristics of characters in the scene, and response characteristics of objects in the scene.

5. The computer-implemented method of claim 1, wherein said scene attribute settings set by said scene characteristic control label are modifiable by a user as part of modifying operations associated with said scene characteristic control label.

6. The computer-implemented method of claim 1, wherein said scene characteristic control label further modifies attributes for a member of a group placed into said first scene, the group consisting of: characters, objects, and backgrounds.

7. The computer-implemented method of claim 6, wherein members of the group consisting of characters, objects, and backgrounds are provided with character, object, and background attribute controls, respectively, and further wherein said character, object, and background attribute controls include an option to preclude a scene characteristic control label from modifying attributes of said members of said group.

8. The computer-implemented method of claim 1, in which the animation system includes an attribute copy interface and control, and further comprising selecting a source character, object, or background and a target source character, object, or background, and applying by selecting said attribute copy interface and control selected animation attributes of said selected character, object, or background to said selected target character, object, or background, respectively.

9. A computer-based system for creating animated video content, comprising:
    a computer-based scene memory containing a plurality of scenes, from which a first scene is selected and into which one or more characters, objects, or backgrounds are placed, said first scene comprising a plurality of scene attribute settings, wherein said plurality of scene attribute settings comprise audience attribute settings related to age of audiences;
    a computer-based scene characteristic control label user interface enabling a user to select a scene characteristic control label, from a set of scene characteristic control labels, and to select an audience attribute for setting an age appearance of said one or more characters, wherein said user interface includes a timeline into which scenes are organized in a time-wise manner, and wherein said user interface enables said scene characteristic control label to be provided onto said timeline overlaying at least a portion of a length of said first scene, in which said scene characteristic control label is scene mood; and
    a processor which, in response to said selection of said scene characteristic control label onto the timeline, sets said scene attribute settings for said portion of the length of said selected scene in accordance with a meaning associated with said characteristic control label and said audience attributes, and displays on a map interface given scene mood of a character or object in said animated video content as a function of time per scene of said animated video content, wherein said map interface maps to said timeline on said computer interface, and in which said mood of said character is compared to the mood of another character at various points in time.

10. The computer-based system of claim 9, wherein said computer-based scene characteristic control label user interface enables selecting a label from the group consisting of: scene mood, scene region, and scene animation style.

11. The computer-based system of claim 9, wherein said scene attribute settings are selected from the group consisting of: scene lighting, view or camera angle, focus, scene layout, audio volume, background audio, response characteristics of characters in the scene, and response characteristics of objects in the scene.

12. A computer-implemented method for creating animated video content, comprising:
    selecting a first scene, from a set of scenes stored in a computer-based memory, into which one or more characters, objects, or backgrounds are placed, said first selected scene comprising a first set of scene attribute settings, wherein said first selected scene comprises a character, object, or background disposed in a first position;

selecting a second scene, from the set of scenes stored in the computer-based memory, into which one or more characters, objects or backgrounds are placed, said second selected scene comprising a second set of scene attribute settings, wherein said second selected scene comprises said character, object, or background disposed in a second position different than said first position;

providing a timeline on a computer interface of an animation system into which said first scene and said second scene are inserted in a time-wise manner among other scenes;

assigning a first scene characteristic control label to said timeline on said computer interface overlaying at least a portion of a length of said first scene and a second scene characteristic control label to said timeline on said computer interface overlaying at least a portion of a length of said second scene, wherein said assignment of said first and second scene characteristic control labels to said timeline set scene attribute settings for said portion of the length of said first scene and said second scene in accordance with a meaning associated with said first and second scene characteristic control labels;

assigning to said timeline on said computer interface a scene transition label, from a set of scene transition labels, to overlap a portion of said first scene and said second scene on said timeline to thereby set said first set of scene attribute settings for one or more characters or objects in said first selected scene and said second set of scene attribute settings for one or more characters or objects in said second selected scene, such that a transition between said first selected scene and said selected second scene in said animated video content occurs in accordance with an emotional meaning associated with said scene transition label to control the transition between said character, object or background disposed in said first position and said character, object, or background disposed in said second position; and inserting a plurality of animated transition frames between said first selected scene and said second selected scene during which said character, object or background transitions from said first position to said second position.

13. The computer-implemented method of claim 12, wherein said first selected scene comprises a first view of a character, object or background and said second selected scene comprises a second view of said character, object or background different than said first view, and further wherein said selected scene transition label controls the transition between said first view of said character, object or background and said second view of said character, object or background.

14. The computer-implemented method of claim 12, wherein each of said first and second positions of said character, object or background are first and second locations of said character, object or background, respectively.

15. The computer-implemented method of claim 12, wherein specific first and second scene attributes set by said scene transition label are modifiable by a user as part of modifying operations associated with said scene transition label.

16. The computer-implemented method of claim 12, wherein said scene transition label further modifies attributes for a member of a group placed into said first scene or said second scene, the group consisting of: characters, objects, and backgrounds.

17. The computer-implemented method of claim 16, wherein members of the group consisting of characters, objects, and backgrounds are provided with character, object, and background attribute controls, respectively, and further wherein said character, object, and background attribute controls include an option to preclude a scene transition label from modifying attributes of said members of said group.

18. A computer-based system for creating animated video content, comprising:

a computer-based scene memory containing a plurality of scenes, from which a first scene is selected and into which one or more characters, objects, or backgrounds are placed, said first selected scene comprising a first set of scene attribute settings and comprising a character, object, or background disposed in a first position, and from which a second scene is selected and into which one or more characters, objects or backgrounds are placed, said second selected scene comprising a second set of scene attribute settings and comprising said character, object, or background disposed in a second position different than said first position;

a computer-based user interface including a timeline into which said first scene and said second scene are inserted in a time-wise manner among other scenes, and enabling a user to assign a first scene characteristic control label to said timeline on said computer interface overlaying at least a portion of a length of said first scene and a second scene characteristic control label to said timeline on said computer interface overlaying at least a portion of a length of said second scene, wherein said assignment of said first and second scene characteristic control labels to said timeline set scene attribute settings for said portion of the length of said first scene and said second scene in accordance with a meaning associated with said first and second scene characteristic control labels;

the computer-based user interface further enabling a user to select a scene transition label, from a set of scene transition labels, and assign to said timeline on said computer interface the selected scene transition label to overlap a portion of said first scene and said second scene on said timeline; and a processor which, in response to said selection of said scene transition label, sets said first set of scene attribute settings for said first selected scene and said second set of scene attribute settings for said second selected scene, such that a transition between said first selected scene and said selected second scene in said animated video content occurs in accordance with an emotional meaning associated with said scene transition label, and further wherein said processor renders the transition between said character, object or background disposed in said first position and said character, object, or background disposed in said second position in response to said selected scene transition label and inserts a plurality of animated transition frames between said first selected scene and said second selected scene during which said character, object or background transitions from said first position to said second position.

* * * * *